US011126986B2

(12) United States Patent
Tichy

(10) Patent No.: US 11,126,986 B2
(45) Date of Patent: Sep. 21, 2021

(54) COMPUTERIZED POINT OF SALE INTEGRATION PLATFORM

(71) Applicant: Gregory Tichy, North Hollywood, CA (US)

(72) Inventor: Gregory Tichy, North Hollywood, CA (US)

( * ) Notice: Subject to any disclaimer, the term of this patent is extended or adjusted under 35 U.S.C. 154(b) by 100 days.

(21) Appl. No.: 16/579,470

(22) Filed: Sep. 23, 2019

(65) Prior Publication Data
US 2021/0090047 A1   Mar. 25, 2021

(51) Int. Cl.
*G06Q 20/20* (2012.01)

(52) U.S. Cl.
CPC ......... *G06Q 20/202* (2013.01); *G06Q 20/203* (2013.01)

(58) Field of Classification Search
CPC .......................... G06Q 20/202; G06Q 20/203
See application file for complete search history.

(56) References Cited

U.S. PATENT DOCUMENTS

| | | | |
|---|---|---|---|
| 6,976,006 B1 | 12/2005 | Verma et al. | |
| 7,149,698 B2 | 12/2006 | Guheen et al. | |
| 7,475,024 B1 * | 1/2009 | Phan | G06Q 10/087 705/22 |
| 8,160,929 B1 * | 4/2012 | Park | G06Q 30/0601 705/26.1 |
| 8,499,100 B1 | 7/2013 | Rothstein | |
| 8,688,524 B1 * | 4/2014 | Ramalingam | G06Q 20/20 705/16 |
| 8,756,168 B1 * | 6/2014 | Jayaram | G06Q 30/0268 705/347 |
| 9,082,143 B1 * | 7/2015 | Cleary | G06Q 30/0639 |
| 9,697,531 B1 * | 7/2017 | Bourget | G06Q 30/0206 |
| 9,760,924 B2 * | 9/2017 | Cumberland | G06F 16/9537 |
| 9,805,380 B2 * | 10/2017 | Cumberland | G06Q 30/0605 |
| 9,865,009 B2 * | 1/2018 | Chiang | H04M 15/81 |
| 10,339,548 B1 * | 7/2019 | Kumar | G06Q 30/0206 |
| 10,395,297 B1 * | 8/2019 | Ivie | G06Q 30/0631 |

(Continued)

OTHER PUBLICATIONS

Jiang, Guoyin et al. "Agent-Based Modeling and Simulation of the Decision Behaviors of e-Retailers." Industrial management + data systems 118.5 (2018): 1094-1113. Web. (Year: 2018).*

(Continued)

*Primary Examiner* — Ashford S Hayles
(74) *Attorney, Agent, or Firm* — Patent Ingenuity , P.C.; Samuel K. Simpson

(57) ABSTRACT

A computer implemented point of sale integration platform may be distinct from a merchant point of sale system. The computer implemented point of sale integration platform has a receiver configured to receive point of sale data from the merchant point of sale system, and social media data from a social media platform. The point of sale data is generated as a result of one or more sales at a physical store of a merchant. Furthermore, the computer implemented point of sale integration platform has a processor configured to link the point of sale data to the social media data to be placed in an integrated merchant point of sale data structure, configured to generate one or more rule-based instructions based on the linkage, and configured to perform an adjustment to a product feature based on the one or more rule-based instructions.

2 Claims, 16 Drawing Sheets

(56) References Cited

U.S. PATENT DOCUMENTS

| | | | |
|---|---|---|---|
| 10,402,064 B1* | 9/2019 | Al-Sallami | G06Q 20/12 |
| 10,684,738 B1* | 6/2020 | Sicora | G06F 16/435 |
| 10,909,590 B2* | 2/2021 | Brock | G06Q 30/0282 |
| 2003/0163399 A1* | 8/2003 | Harper | G06Q 10/087 |
| | | | 705/35 |
| 2004/0117383 A1* | 6/2004 | Lee | G06Q 30/00 |
| 2004/0249883 A1 | 12/2004 | Srinivasan et al. | |
| 2007/0130090 A1* | 6/2007 | Staib | G06Q 30/0222 |
| | | | 705/400 |
| 2009/0106085 A1* | 4/2009 | Raimbeault | G06Q 20/208 |
| | | | 705/14.44 |
| 2010/0106609 A1* | 4/2010 | Sherman | G06Q 20/202 |
| | | | 705/21 |
| 2010/0191578 A1* | 7/2010 | Tran | G06Q 30/0217 |
| | | | 705/26.7 |
| 2011/0055029 A1* | 3/2011 | Nicolas | G06Q 30/02 |
| | | | 705/16 |
| 2011/0106616 A1 | 5/2011 | Bigby et al. | |
| 2011/0125566 A1* | 5/2011 | McLaughlin | G06Q 30/0222 |
| | | | 705/14.23 |
| 2012/0054002 A1* | 3/2012 | Rotbard | G06Q 30/02 |
| | | | 705/14.3 |
| 2012/0185544 A1* | 7/2012 | Chang | G06F 16/2465 |
| | | | 709/206 |
| 2012/0284131 A1* | 11/2012 | Soffer | G06Q 20/3278 |
| | | | 705/17 |
| 2012/0303425 A1* | 11/2012 | Katzin | G06Q 20/32 |
| | | | 705/14.4 |
| 2013/0006816 A1* | 1/2013 | Nuzzi | G06Q 30/0261 |
| | | | 705/27.1 |
| 2013/0046621 A1* | 2/2013 | Asseoff | G06Q 30/02 |
| | | | 705/14.51 |
| 2013/0054367 A1* | 2/2013 | Grigg | G06Q 30/0207 |
| | | | 705/14.58 |
| 2013/0073388 A1* | 3/2013 | Heath | G06Q 30/02 |
| | | | 705/14.53 |
| 2013/0138492 A1* | 5/2013 | Delgado | G06Q 30/02 |
| | | | 705/14.25 |
| 2013/0144701 A1* | 6/2013 | Kulasooriya | G06Q 30/0253 |
| | | | 705/14.24 |
| 2013/0173377 A1* | 7/2013 | Keller | G06Q 30/0261 |
| | | | 705/14.35 |
| 2013/0173430 A1* | 7/2013 | Benjamin | G06Q 30/0627 |
| | | | 705/26.63 |
| 2013/0198002 A1* | 8/2013 | Nuzzi | G06Q 30/0256 |
| | | | 705/14.58 |
| 2013/0226702 A1* | 8/2013 | Burke | G06Q 30/0267 |
| | | | 705/14.57 |
| 2013/0231990 A1* | 9/2013 | Munjal | G06Q 30/0631 |
| | | | 705/14.23 |
| 2013/0275192 A1* | 10/2013 | Aissa | G06Q 30/0226 |
| | | | 705/14.15 |
| 2013/0282440 A1* | 10/2013 | Isaac | G06Q 30/0273 |
| | | | 705/7.35 |
| 2013/0282520 A1* | 10/2013 | Tapley | H04W 4/029 |
| | | | 705/26.8 |
| 2013/0297380 A1* | 11/2013 | Godsey | G06Q 30/0202 |
| | | | 705/7.31 |
| 2013/0304578 A1* | 11/2013 | Kannan | G06Q 30/0261 |
| | | | 705/14.54 |
| 2013/0311335 A1* | 11/2013 | Howard | G06Q 30/0625 |
| | | | 705/26.64 |
| 2014/0040014 A1* | 2/2014 | Anand | G06Q 30/06 |
| | | | 705/14.45 |
| 2014/0089072 A1* | 3/2014 | Freund | G06Q 20/384 |
| | | | 705/14.27 |
| 2014/0108179 A1* | 4/2014 | Zhu | G06Q 30/0601 |
| | | | 705/26.3 |
| 2014/0121967 A1* | 5/2014 | Anbalagan | G06Q 30/0633 |
| | | | 701/540 |
| 2014/0156346 A1* | 6/2014 | Cai | G06Q 50/01 |
| | | | 705/7.31 |
| 2014/0164046 A1* | 6/2014 | Haralambos | G06Q 20/18 |
| | | | 705/7.25 |
| 2014/0164179 A1* | 6/2014 | Geisinger | G06Q 30/02 |
| | | | 705/26.41 |
| 2014/0207592 A1* | 7/2014 | Kavis | G06Q 20/202 |
| | | | 705/21 |
| 2014/0214501 A1* | 7/2014 | Schilling | G06Q 50/01 |
| | | | 705/14.2 |
| 2014/0214518 A1* | 7/2014 | Hatch | G06Q 30/0225 |
| | | | 705/14.34 |
| 2014/0244351 A1* | 8/2014 | Symons | G06F 16/13 |
| | | | 705/7.29 |
| 2014/0279039 A1* | 9/2014 | Systrom | G06Q 30/0224 |
| | | | 705/14.66 |
| 2014/0304093 A1* | 10/2014 | Cheng | G06Q 30/0207 |
| | | | 705/16 |
| 2014/0316875 A1* | 10/2014 | Tkachenko | G06Q 30/0224 |
| | | | 705/14.25 |
| 2014/0337160 A1* | 11/2014 | Jin | G06Q 50/01 |
| | | | 705/26.7 |
| 2014/0351008 A1* | 11/2014 | Oyamatsu | G06Q 30/0202 |
| | | | 705/7.29 |
| 2014/0379497 A1* | 12/2014 | Varma | G06Q 30/06 |
| | | | 705/14.73 |
| 2015/0006335 A1* | 1/2015 | Vasantham | G06Q 20/203 |
| | | | 705/28 |
| 2015/0025986 A1* | 1/2015 | Patel | G06Q 20/384 |
| | | | 705/16 |
| 2015/0051955 A1* | 2/2015 | Kumar | G06Q 30/0206 |
| | | | 705/7.35 |
| 2015/0095111 A1* | 4/2015 | Tang | G06Q 30/0202 |
| | | | 705/7.31 |
| 2015/0100405 A1* | 4/2015 | Lee | G06Q 30/0255 |
| | | | 705/14.39 |
| 2015/0186911 A1* | 7/2015 | Vierra | G06Q 10/087 |
| | | | 705/7.35 |
| 2015/0206219 A1* | 7/2015 | Zamer | G06Q 30/0629 |
| | | | 705/7.18 |
| 2015/0213565 A1* | 7/2015 | Garrett | G06Q 20/202 |
| | | | 705/15 |
| 2015/0235194 A1* | 8/2015 | Rashid | G06Q 30/02 |
| | | | 705/21 |
| 2015/0235239 A1* | 8/2015 | Chowdhary | G06Q 50/01 |
| | | | 705/7.31 |
| 2015/0294383 A1 | 10/2015 | Rosenoff et al. | |
| 2015/0302378 A1* | 10/2015 | Richelson | G06Q 20/206 |
| | | | 705/18 |
| 2015/0317659 A1* | 11/2015 | Nayak | G06Q 30/0206 |
| | | | 705/7.35 |
| 2015/0317681 A1* | 11/2015 | Zamer | G06Q 30/0273 |
| | | | 705/14.58 |
| 2015/0332298 A1* | 11/2015 | Ettl | G06Q 30/0206 |
| | | | 705/7.35 |
| 2015/0371265 A1* | 12/2015 | Leisher | G06Q 30/0261 |
| | | | 705/14.55 |
| 2016/0005063 A1* | 1/2016 | Zimmerman | G06Q 30/0276 |
| | | | 705/7.35 |
| 2016/0034937 A1* | 2/2016 | Nickerson | G06Q 30/0214 |
| | | | 705/14.16 |
| 2016/0048880 A1* | 2/2016 | Linden | H04L 67/42 |
| | | | 705/14.66 |
| 2016/0078568 A1* | 3/2016 | Trivedi | G06Q 40/02 |
| | | | 705/33 |
| 2016/0140604 A1* | 5/2016 | Blackhurst | G06Q 30/0246 |
| | | | 705/14.45 |
| 2016/0162913 A1 | 6/2016 | Linden et al. | |
| 2016/0162930 A1* | 6/2016 | Duggal | G06Q 30/0245 |
| | | | 705/14.44 |
| 2016/0171475 A1* | 6/2016 | Hughes | G06Q 30/0259 |
| | | | 455/456.3 |
| 2016/0210682 A1* | 7/2016 | Kannan | G06Q 30/0633 |
| 2016/0253688 A1* | 9/2016 | Nielsen | G06F 16/337 |
| | | | 705/7.31 |
| 2016/0292157 A1* | 10/2016 | Zhang | G06F 16/3344 |
| 2017/0083817 A1* | 3/2017 | Di Sciullo | G06N 5/022 |
| 2017/0083953 A1* | 3/2017 | Arora | H04W 4/02 |

(56) References Cited

U.S. PATENT DOCUMENTS

| | | | |
|---|---|---|---|
| 2017/0124606 A1* | 5/2017 | Belle | G06Q 30/0255 |
| 2017/0148037 A1* | 5/2017 | Sengupta | G06Q 30/0631 |
| 2017/0161806 A1* | 6/2017 | Pearson | G06Q 30/0603 |
| 2017/0200183 A1* | 7/2017 | Lim | G06Q 50/01 |
| 2017/0249689 A1* | 8/2017 | O'Neill | G06Q 10/087 |
| 2017/0262873 A1* | 9/2017 | Atchley | G06Q 50/01 |
| 2017/0278169 A1* | 9/2017 | Kneubuhl | G06Q 30/0283 |
| 2017/0308909 A1* | 10/2017 | Faith | G06K 9/00315 |
| 2017/0316442 A1* | 11/2017 | Ni | G06Q 30/0203 |
| 2017/0330211 A1* | 11/2017 | Deshpande | G06Q 10/087 |
| 2017/0357480 A1* | 12/2017 | Placa | G06Q 40/06 |
| 2018/0033062 A1* | 2/2018 | Taylor | G06Q 50/01 |
| 2018/0182013 A1* | 6/2018 | Haubold | G06Q 30/0641 |
| 2018/0232750 A1* | 8/2018 | Spencer | G06Q 50/01 |
| 2018/0253752 A1* | 9/2018 | Lam | G06K 7/10554 |
| 2018/0276710 A1* | 9/2018 | Tietzen | G06N 20/00 |
| 2018/0341965 A1* | 11/2018 | Rapperport | G06Q 30/0211 |
| 2019/0019228 A1* | 1/2019 | Reddy | G06Q 30/0224 |
| 2019/0108538 A1* | 4/2019 | Montero | G06Q 30/0211 |
| 2019/0141021 A1* | 5/2019 | Isaacson | G06Q 30/0625 |
| 2019/0251538 A1* | 8/2019 | Grosh | G06Q 20/14 |
| 2019/0370838 A1* | 12/2019 | Vierra | G06Q 30/0206 |
| 2020/0250721 A1* | 8/2020 | Dana | G06Q 20/201 |
| 2020/0294108 A1* | 9/2020 | Perry | G06Q 30/0201 |
| 2020/0342498 A1* | 10/2020 | Frohwein | G06Q 20/322 |
| 2020/0349620 A1* | 11/2020 | Ellis | H04L 51/18 |
| 2020/0402118 A1* | 12/2020 | Perry | G06Q 30/0641 |
| 2020/0403954 A1* | 12/2020 | Perry | G06Q 30/0601 |
| 2021/0035123 A1* | 2/2021 | Meredith | G06Q 20/20 |

OTHER PUBLICATIONS

Kocas, Cenk, and Can Akkan. "How Trending Status and Online Ratings Affect Prices of Homogeneous Products." International journal of electronic commerce 20.3 (2016): 384-407. Web. (Year: 2016).*

International Search Report, PCT/US2020/051871, dated Dec. 22, 2020.

* cited by examiner

COMPUTERIZED POINT OF SALE INTEGRATION PLATFORM

BACKGROUND

1. Field

This disclosure generally relates to the field of computing systems. More particularly, the disclosure relates to Point of Sale ("POS") systems.

2. General Background

With recent advances in technology, users wishing to purchase a product or service at a physical location (a "brick-and-mortar store") may perform an electronic search via a variety of search engines over the Internet. What will often occur is that those search engines will produce one or more lists of search results that include not only the product or service for which the user seeks to purchase, but also variations thereof. For example, a user may input a search term for a particular model of a television that the user wants to purchase, only to obtain search results with brick-and-mortar stores that sell that particular television in addition to different television models, and even television accessories. As a result, the user is often left sifting through many search results in an attempt to figure out which search results are applicable and which are not.

And such haphazard product and service searching is not limited to just end users; merchants providing the products and services often wish to search for the same products and services offered by their competitors. By having to sift through voluminous amounts of data for just one product, merchants that typically offer thousands of different products are often left having to use extensive computing resources to be aware of current product and services features offered by competitors.

As a result, both end-users and merchants often expend significant amounts of computing resources (e.g., network bandwidth, computing device memory, etc.) searching for the exact same product offerings from physical brick-and-mortar stores having an online presence. Accordingly, current product and service search methodologies inefficiently use computing resources, and still do not generate an optimal set of search results particular to the intended product or service to be purchased by the end-user.

SUMMARY

A computer implemented POS integration platform may be distinct from a merchant POS system. The computer implemented POS integration platform has a receiver configured to receive POS data from the merchant POS system, and social media data from a social media platform. The POS data is generated as a result of one or more sales at a physical store of a merchant. Furthermore, the computer implemented POS integration platform has a processor configured to link the POS data to the social media data to be placed in an integrated merchant POS data structure, configured to generate one or more rule-based instructions based on the linkage, and configured to perform an adjustment to a product feature based on the one or more rule-based instructions. Additionally, the computer implemented POS integration platform has a memory device that stores the integrated merchant POS data structure. Finally, the computer implemented POS integration platform has a transmitter that sends the adjustment to the merchant POS system.

Alternatively, a computer program product may have a computer readable storage device with a computer readable program stored thereon that implements the functionality of the aforementioned platform, or a different platform. The computer readable program when executed on a computer causes the computer to receive, at a merchant POS system, POS data. The POS data may be generated as a result of one or more sales at a physical store of a merchant. Furthermore, the computer is caused to receive, via an application programming interface ("API"), social media data from a social media platform. Additionally, the computer is caused to link, with a processor at the merchant POS system, the POS data to the social media data to be placed in an integrated merchant POS data structure. The computer is also caused to generate, with the processor at the merchant POS system, one or more rule-based instructions based on the linkage. Moreover, the computer is caused to perform, with the processor at the merchant POS system, an adjustment to a product feature based on the one or more rule-based instructions. Finally, the computer is caused to store, with a memory device at the merchant POS system, the integrated merchant POS data structure.

As yet another alternative, a process that utilizes a processor may implement the functionality of the aforementioned platform, or a different platform. The process receives, at a merchant POS system, POS data, merchant web portal data, and inventory management data. The POS data is generated as a result of one or more sales at a physical store of a merchant. Furthermore, the process extracts, with the processor, product data from the web portal corresponding to a product associated with the POS data. Additionally, the process receives, via an API, social media data from a social media platform. The process also receives, from a customer relationship management ("CRM") database, CRM data. In addition, the process links, with a processor at the merchant POS, the point of sale data, the CRM data, and the inventory management data to the social media data to be placed in an integrated merchant point of sale data structure. The process also generates, with the processor at the merchant POS system, one or more rule-based instructions based on the linkage. The one or more rule-based instructions include one or more social media review conditions, one or more inventory management conditions, and one or more CRM conditions. Furthermore, the process performs, with the processor at the merchant POS system, an adjustment to a product price based on the one or more rule-based instructions. Additionally, the process stores, with a memory device at the merchant POS system, the integrated merchant POS data structure. The process also generates, with the processor, a web portal hub interface that integrates a merchant web portal with a plurality of additional merchant web portals. The merchant web portal corresponds to a merchant associated with the merchant POS system. The plurality of additional merchant web portals are associated with a plurality of additional merchants that are distinct from the merchant. Finally, the process generates, with the processor, a dynamic search engine that is limited to searching for an exact product amongst the merchant web portal and the plurality of additional merchant web portals, and displaying only exact product search results.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1A:
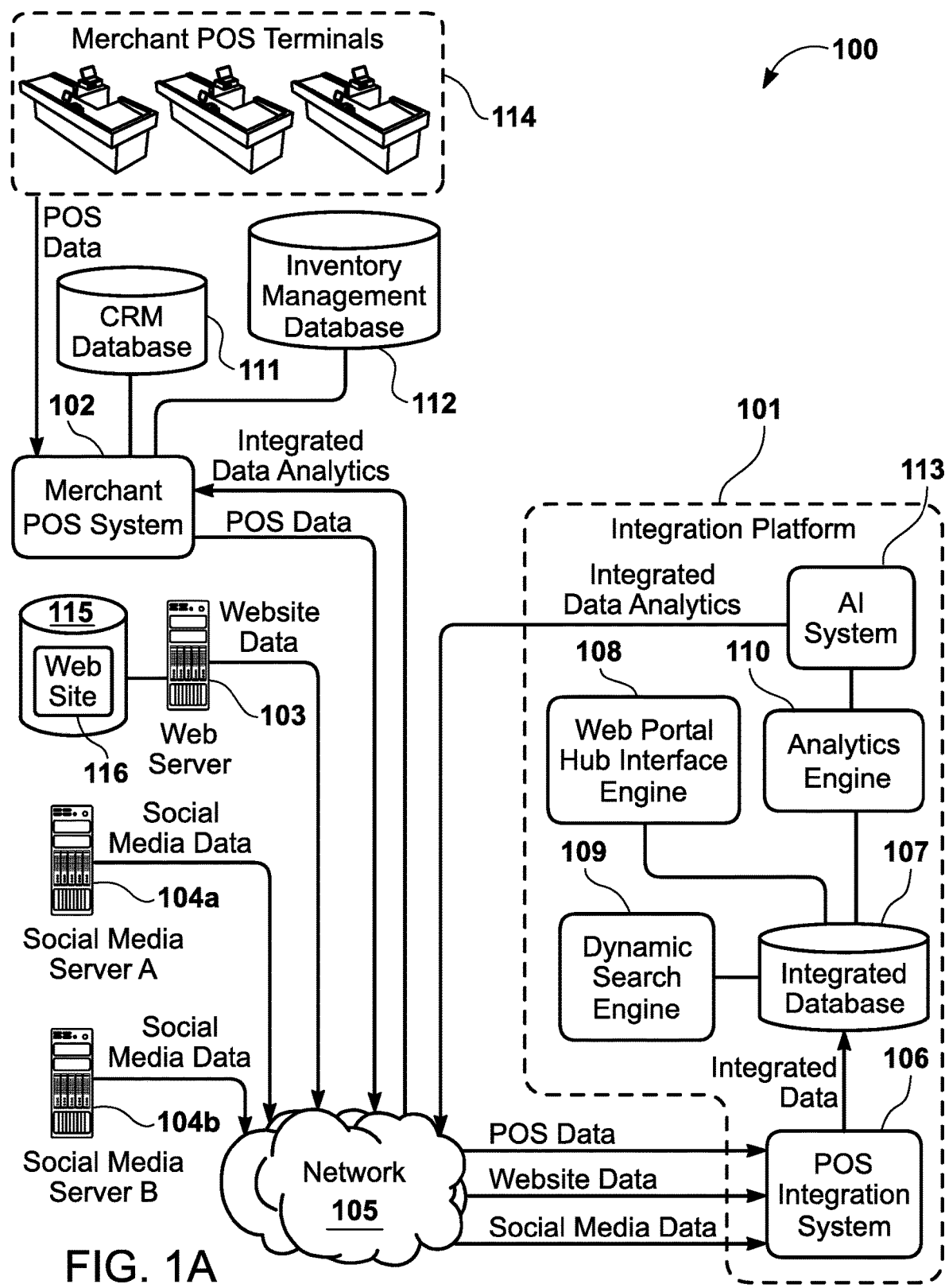
FIG. 1A illustrates the POS integration configuration depicting the POS integration platform being remotely situated from a merchant POS system, which processes sales transactions for a merchant.

A computerized POS integration platform is provided for use in physical brick-and-mortar stores, potentially with an additional online presence. Being implemented at least within the POS system of a physical brick-and-mortar store, the computerized POS integration platform ingests a multitude of data sets and integrates those data sets for various purposes. For example, the computerized POS integration platform may receive sales data for a particular product from the POS system of the physical brick-and-mortar store in addition to social media data corresponding to that product. The computerized POS integration platform may then integrate the sales data with the social media data into an integrated data set that may be utilized as a basis for generating a graphical user interface ("GUI") from which an end-user may dynamically search for that particular product.

As a result, the end-user is able to perform a more precise, and less computationally-intensive, search than previous approaches to finding a particular product of interest at a brick-and-mortar store. In other words, the search results may be specifically limited to brick-and-mortar stores selling the exact product or service of interest to the end-user, not voluminous variations thereof. Furthermore, the search results may present to the user various social media features (e.g., reviews) within a unified GUI so that the end-user may view not only merchants that offer the exact product or service of interest, but also corresponding social media that may correspond to the product and/or the merchant. For example, the end-user may view the GUI and determine five potential merchants that are geolocated within proximity to the end-user, and may also view social media reviews corresponding to other end-user, in-store experiences when purchasing the particular product at each of the merchants (i.e., one merchant may have better reviews because it has a return policy with a longer duration than the other merchants). The end-user may also utilize the GUI to compare prices from different merchants for the exact same product. Accordingly, the end-user is able to effectively perform a single search with minimal computing resources and power, as opposed to prior configurations that may have necessitated dozens of searches, to quickly determine which merchant from which to purchase the product of interest. Furthermore, the GUI may present the integrated data in a manner that improves the usability of the computing device (e.g., smartphone, tablet device, smartwatch, personal computer, laptop computer, etc.) utilized by the end-user.

The merchant is also able to access the same GUI to automatically determine price adjustments for the exact same product or service based on competitor offerings. Additionally, the computerized POS integration platform may be utilized by a merchant to generate a merchant-specific GUI that presents additional data, which is not viewable by the end-user specific GUI. For instance, the merchant-specific GUI may present additional data (e.g., inventory data, CRM data, etc.) that is integrated for viewability by the merchant. The merchant may utilize the merchant-specific GUI to establish one or more rules to automatically adjust price. For example, the rules may dictate that a price should be modified to match all competitors within five miles of the end-user with a lower price for the same product if inventory exceeds a predetermined inventory threshold and social media reviews for the particular merchant are below a predetermined social media threshold. In other words, the merchant is able to dynamically adjust its pricing of a particular product based on preconfigured parameters from the integrated POS and social media data set, without any bidding performed by the end-user. In essence, the end-user is insulated from automatic price adjustments between merchants, but is able to benefit from such price adjustments. As another example, the merchant is able to use the CRM data to customize price adjustments based on particular users. For instance, a user that is a frequent shopper, as determined by the CRM system, may obtain more of a discount than one who is not. As yet another example, a customer who is an avid purchaser of the product (i.e., as identified by the CRM system as having purchased at least a predetermined quantity of the product) and active on social media (i.e., as identified by a social media platform as having a predetermined quantity of reviews, blogs, posts, etc.) may obtain more of a discount.

Accordingly, the computerized POS integration platform improves the functioning of a computing system by optimizing search functionality for both merchants and end-users, reducing memory requirements as a result of an improved data structure that is product-specific or service-specific rather than allowing for search variations, improving the usability of a computing device via an end-user GUI and/or a merchant GUI, and linking of the data structures and/or GUIs to social media platforms in a manner that improves the usability of the data structures and/or GUIs.

Figure 1B:
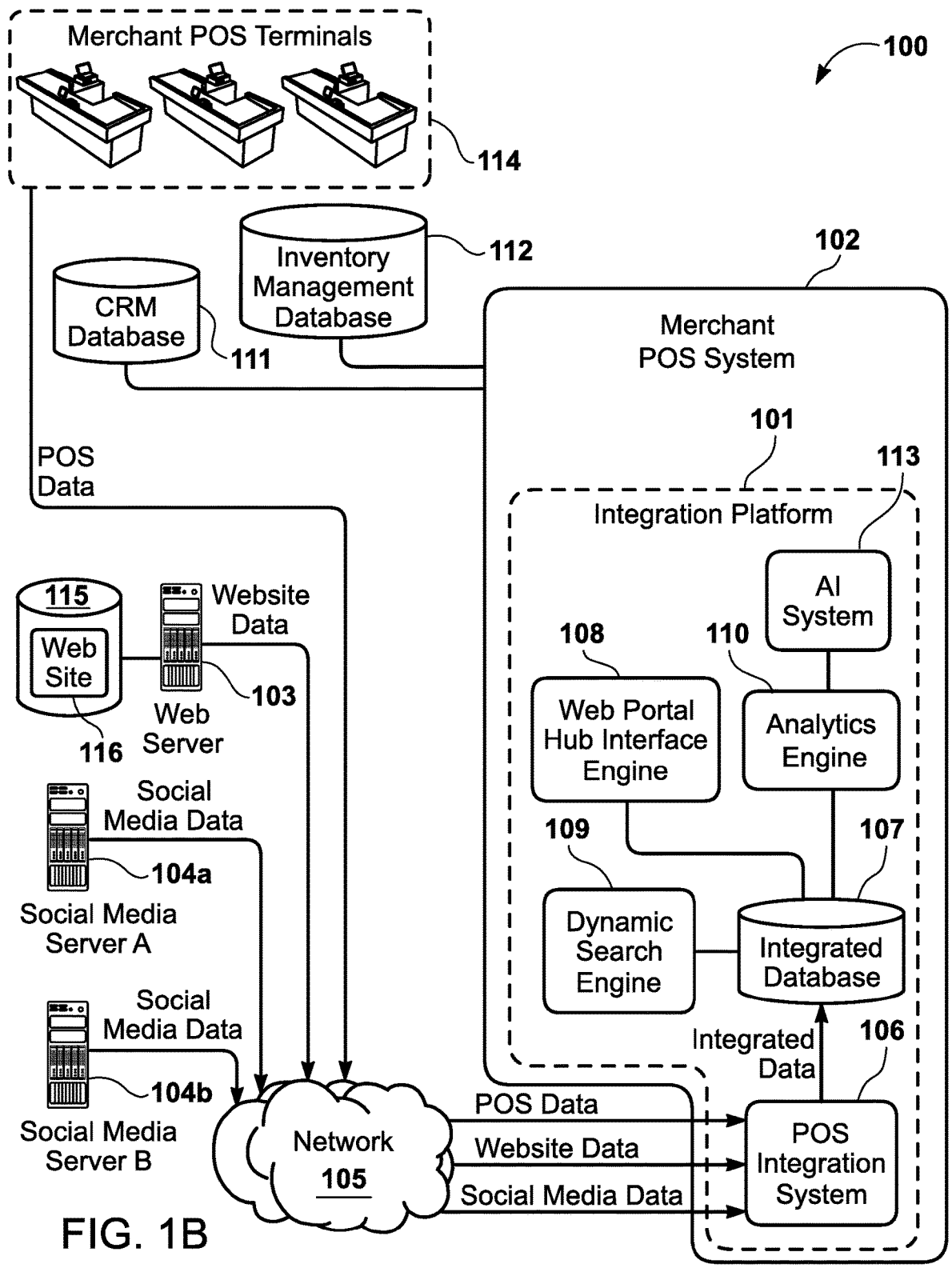
FIG. 1B illustrates a POS integration configuration in which the POS integration platform is implemented at, or within, the merchant POS system.

FIGS. 1A and 1B illustrate a POS integration configuration 100 that depicts the manner in which a particular merchant system interacts with an integration platform 101. In particular, FIG. 1A illustrates the POS integration configuration 100 depicting the POS integration platform 101 being remotely situated from a merchant POS system 102, which processes sales transactions for a merchant. For example, a plurality of POS terminals 114 may be situated at various checkout counters within a brick-and-mortar store of the merchant, each of the plurality of POS terminals 114 may be capable of processing a transaction for a purchase of a product or service offered by the merchant. For example, the plurality of POS terminals 114 may communicate with the merchant POS system 102 via a wired (e.g., Ethernet) or wireless (e.g., WiFi) connection to process payment for the product or service purchased at the merchant's brick-and-mortar store. As a result of such sales transactions, the merchant POS system 102 may use that data as a basis for performing other events (e.g., merchant services, sales, advertising, social media integration, inventory management, analytics, requesting consumer data, generating electronic communications such as email, shipping, and human resource management).

The merchant POS system 102 may implement various software applications and subs-systems to provide accessibility to the multi-user configuration from a variety of computing devices. In particular, the merchant POS system may have a mobile backend control manager application, a merchant frontend mobile system, and a consumer frontend mobile system. The mobile backend control manager application may generate a GUI for a mobile backend user (e.g., a merchant employee) to access backend applications (e.g., analytics engine that analyzes statistical data generated and/or received by the merchant POS system 102) of the merchant POS system 102 from a mobile computing device (e.g., smartphone, tablet device, smartwatch, etc.). Furthermore, the mobile backend control manager application may manage access rights to the backend applications and/or backend data. For example, the mobile backend control manager may manage permission rights for managers monitoring employee events (e.g., security level access, employee profile, employee performance, etc.). As another example, the mobile backend control manager may manage physical locations (also called branches) of a particular merchant (e.g., physical infrastructure, environmental controls, security features, etc.). The mobile backend control manager may even permit communications between various backend users via various forms of communication (email, video conferencing, audio communication, etc.).

Additionally, the merchant frontend mobile system generates a GUI for a merchant employee to access a merchant web portal to perform various functionality, possibly in a different manner such that a customer frontend mobile system generates a GUI for a customer to access the merchant web portal to perform various functionality.

In one embodiment, the merchant POS system 102 is configured (i.e., via software executed by a specialized processor) to ingest data from various sources, generate data, and output data.

For instance, the merchant POS system 102 may receive sales data (e.g., via a wired or wireless connection) for one or more products from a variety of POS terminals 114, each of which may be situated at the same or different brick-and-mortar stores of that particular merchant. For example, the POS system 102 may want to track sales data for a particular product $\alpha$ at stores situated at various geographical locations. By tracking such sales, the merchant POS system 102 may perform a number of functions (e.g., adjusting inventory via an inventory management database 112, communicating with customers via a CRM database 111 to improve sales, etc.

The merchant POS system 102 may be accessed by a variety of users (e.g., merchants, consumers, backend users, etc.). Accordingly, the merchant POS system 102 is a multi-user accessible configuration, which may be accessed (e.g., logged into) by a variety of different computing devices (e.g., kiosk, personal computer ("PC"), laptop, smartphone, tablet device, smartwatch, head-mounted display ("HMD"), etc.), either mobile or stationary, by a variety of different users. In essence, a computing device may be utilized to generate a GUI to the merchant POS system 102. The multi-user accessible configuration may be accessed via a network configuration, which may include one or more routers or gateways for routing data packets between networks.

Furthermore, the merchant may have a website 116 stored in a web database 115, and which is hosted by a webserver 103. The website 116 may provide specific product information about the product $\alpha$, such as product availability at stores that are located in proximity to a customer.

In addition, various social media websites, which may be hosted by social media servers (e.g., social media server 104a and social media server 104b) may display information about the product $\alpha$. These social media websites may operate independently of the merchant POS system 102. For example, customers who purchased the product $\alpha$ may write reviews, make comments, activate like or dislike indicia, etc.

The merchant POS system 102, the webserver 103, and the social media servers 104a and 104b may provide the POS data, website data, and social media data, respectively, via a network 105, to a POS integration platform 101. In particular, a POS integration system 106 within the POS integration platform 101 ingests the foregoing data and integrates that data into a data structure for storage in an integrated database 107. In essence, the POS integration system 106 links data objects, such as POS data and social media data; as a result, an update to one data object may affect how the POS integration system 106 performs analysis, optimizes searches, or generates interfaces.

For instance, the POS integration system 106 has an analytics engine 110, which may be used to analyze the integrated data structure to compare data from the merchant against other merchants. Via an artificial intelligence ("AI") system 113, the integration platform 101 may use those analytics to automatically adjust, or make recommendations for adjustments, to the price of the product $\alpha$. In other words, the POS integration system 106 may determine whether certain thresholds have been met (e.g., social media rating threshold, inventory threshold, etc.) in order to determine whether to perform, or recommend, a price adjustment.

The POS integration system 106 also has a web portal hub interface engine 108, which generates a GUI based on a composition of data pertaining to different merchants offering the product α for sale at their brick-and-mortar stores. The GUI allows users and/or merchants to view product-specific search results, as performed by a dynamic search engine 109, for the exact product α. Accordingly, users and merchants alike do not have to be inundated with products that are variations of the product α; instead, the GUI is optimized to provide users and merchants with the ability to perform a product-specific search for the exact product α. (In an alternative embodiment, variations of the product α may be searched for instead. For example, a variation threshold parameter may be configured to ensure that any products resulting from a search match the product a by at least a predefined percentage.)

In essence, the web portal hub interface engine 108 is a navigational unit that allows end-users to be connected to merchants, and vice-versa. Optionally, the web portal hub interface engine 108 may also act as a digital entertainment center, which allows end-users to enjoy watching videos, sending communications (emails, chats, etc.), and/or social media interaction with respect to merchant products and/or services. Further, the web portal hub interface engine 108 may generate a geolocation map to display the proximity of a user to a local merchant.

Further, the POS integration system 106 allows a user to upload his or her videos, pictures, and/or text messages. For example, the POS integration system 106 may allow the user to directly upload his or her content onto a web portal of the merchant. Also, the POS integration system 106 may allow a user to automatically link his or her videos, pictures, and/or text messages to his or her favorite social media platform. Additionally, other users may view the foregoing videos, pictures, and/or text messages, and interact with such content (e.g., user ratings, comments, sharing, etc.). In other words, the web portal, or each product-specific page of the web portal, of the merchant may become its own social media platform specific to a particular merchant and/or product or service.

Although the integration platform 101 is illustrated as being distinct from the merchant POS system 102, in an alternative embodiment, the integration platform 101, or portions thereof, may be integrated within the merchant POS system 102. In other words, the particular merchant POS system 102 may be configured through a specialized processor to ingest and integrate the sales data, merchant-specific webpage data, and social media data internally without reliance on an external system.

As an alternative to the POS integration configuration 100 illustrated in FIG. 1A, FIG. 1B illustrates a POS integration configuration 150 in which the POS integration platform 101 is implemented at, or within, the merchant POS system 102. For example, the POS integration platform 101 may be an application that is stored on a data storage device at the merchant POS system 102, and is executable by a specialized process configured to perform POS sales operations and/or POS integration operations at the merchant POS system 102.

Figure 2A:
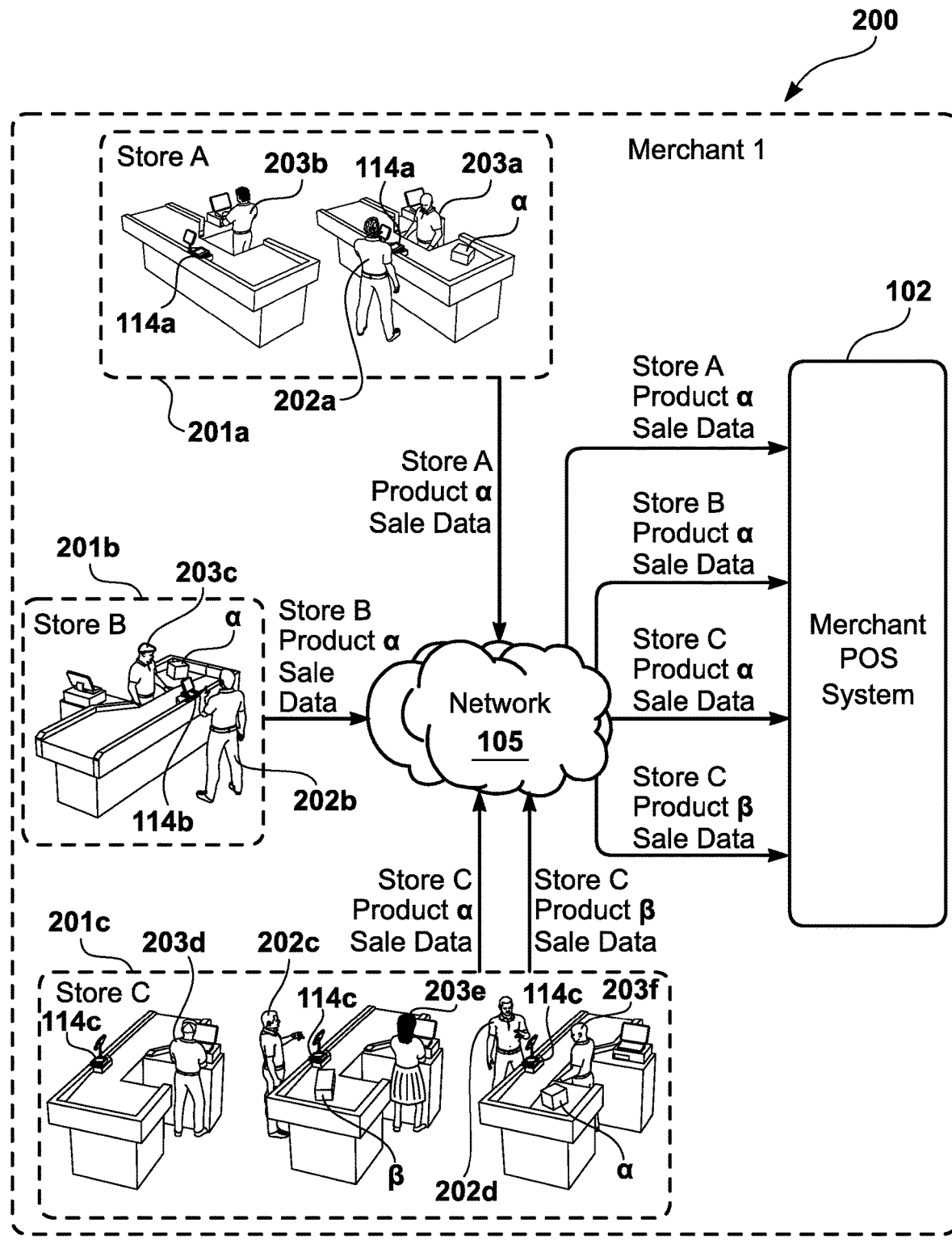
FIG. 2A illustrates a merchant configuration for a first merchant that utilizes sales data the merchant POS system illustrated in FIG. 1A or FIG. 1B.
Figure 2B:
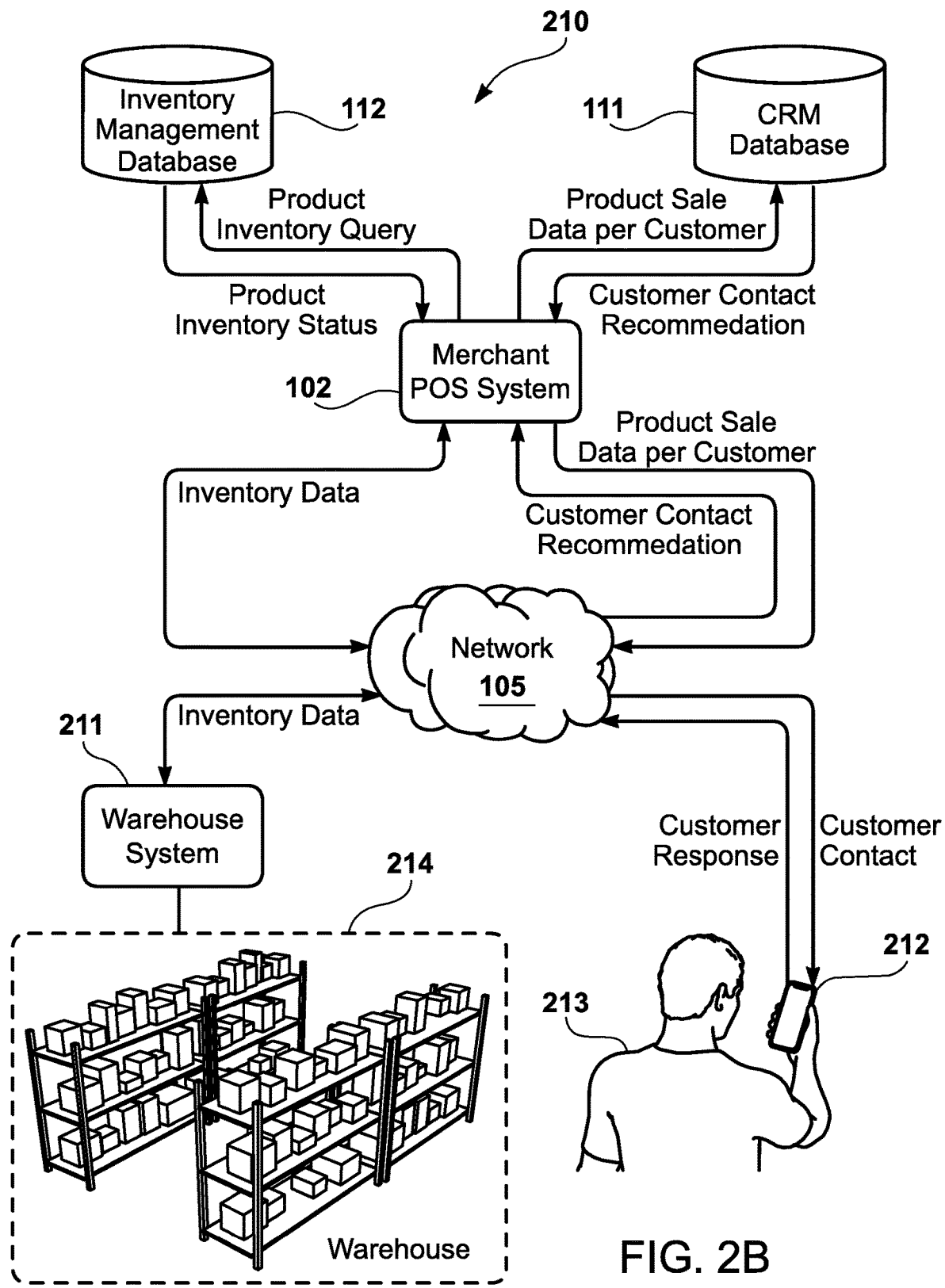
FIG. 2B illustrates a merchant configuration for a first merchant that utilizes inventory data and CRM data generated by the merchant POS system illustrated in FIG. 1A or FIG. 1B.
Figure 2C:
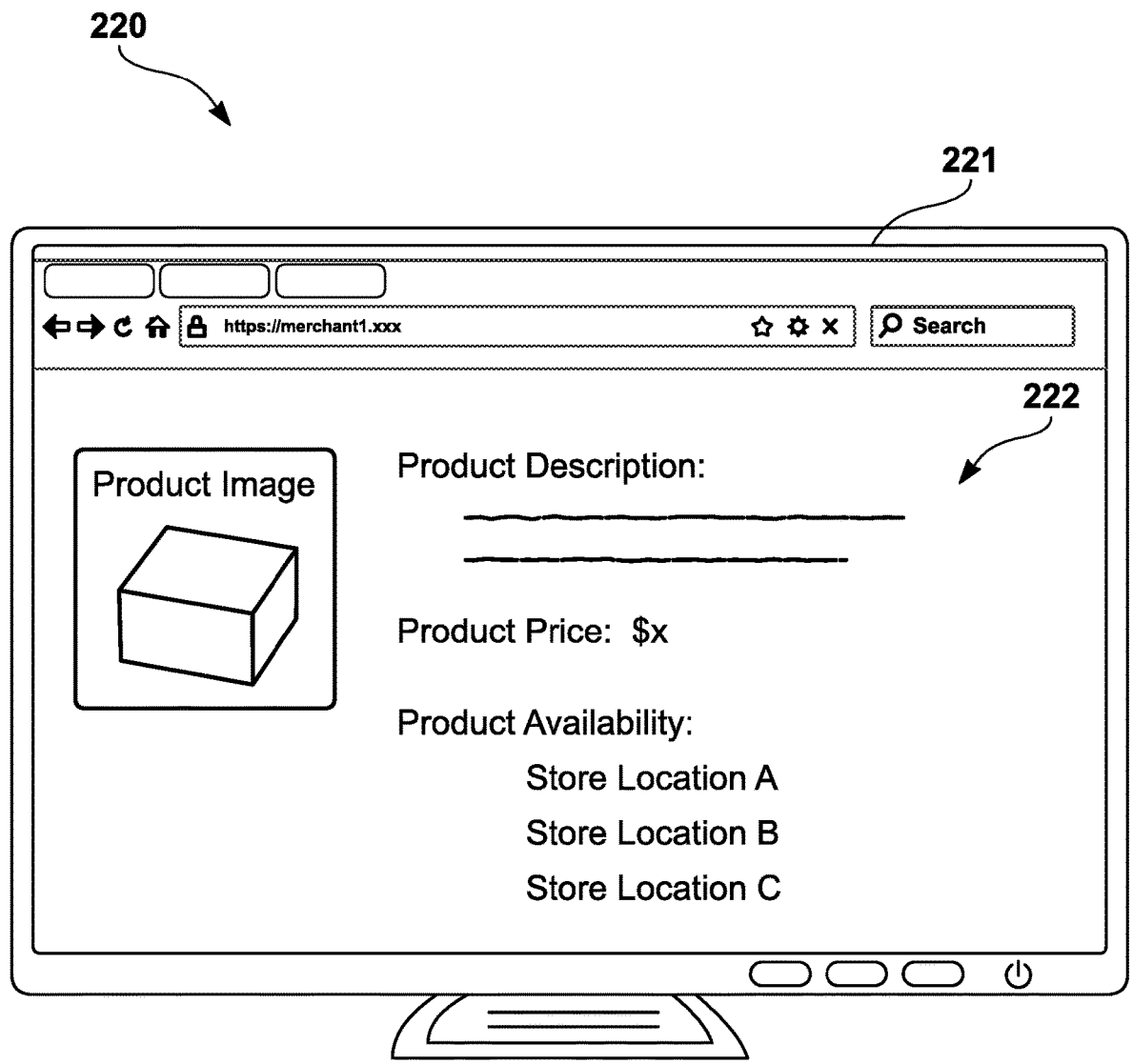
FIG. 2C illustrates a website rendered on a display screen of a display device.

FIGS. 2A-2C illustrate examples of the merchant-specific systems illustrated in FIG. 1 performing a variety of tasks. For instance, FIG. 2A illustrates a merchant configuration 200 for a first merchant that utilizes sales data from the merchant POS system 102 illustrated in FIG. 1. The first merchant may have a plurality of physical stores 201a-c, each being located at distinct geographical locations. Further, each of the physical stores 201a-c may have POS terminals 114 at which the particular product α may be purchased in-store. For example, the first physical store 201a may have a plurality of POS terminals 114a, one of which may be operated by a store cashier 203a, and another may be operated by another store cashier 203b. A customer 202a may bring the product α to the POS terminal 114a, situated at the physical store 201b, at which the store cashier 203a may process payment for the purchase. Similarly, a customer 202b may bring the product α to the POS terminal 114b at which the store cashier 203c may process payment for the purchase. Finally, a customer 202d may bring the product α to the POS terminal 114c, situated at the third physical store 201c, at which the store cashier 203f may process the payment for purchase. Additional store cashiers 203d and/or 203e may assist an additional customer 202c with purchase of a different product β. (The quantity of physical stores, POS terminals 114, store cashiers, customers, and products may different from that which are illustrated for example purposes.) After processing payment data, the POS terminals 114c may send the sales data via the network 105 to the merchant POS system.

Further, FIG. 2B illustrates a merchant configuration 210 for a first merchant that utilizes inventory data and CRM data generated by the merchant POS system 102 illustrated in FIG. 1. In particular, the merchant configuration 210 may utilize the sales data determined by the POS system 102 in FIG. 2A. The merchant POS system 102 may send a product inventory query to the inventory management database 112, and receive a product inventory status based on inventory of the product α as situated on shelves of a warehouse 214.

Additionally, the merchant POS system 102 may utilize the product sales information of the product α as an input to the CRM database 111, and may perform or schedule a customer contact based on data retrieved from the CRM database 111. For example, the merchant POS system 102 may contact a customer 213 by sending a message to a mobile computing device 212. The message may include a discount, promotion, notification, or other form of customer contact to inform/entice the customer 213 to visit a physical store location of the first merchant to purchase the product α.

Finally, the first merchant may have a website that displays information pertaining to the product α. In particular, a website 221 may be rendered on a display screen 221 of a display device 222, as illustrated in FIG. 2C. The website 221 may describe the product, provide the current product price, product availability, etc.

Although physical stores are depicted in FIGS. 2A-2C, the integration platform 101, illustrated in FIG. 1 may, alternatively or additionally, be implemented via virtual stores.

Figure 3:
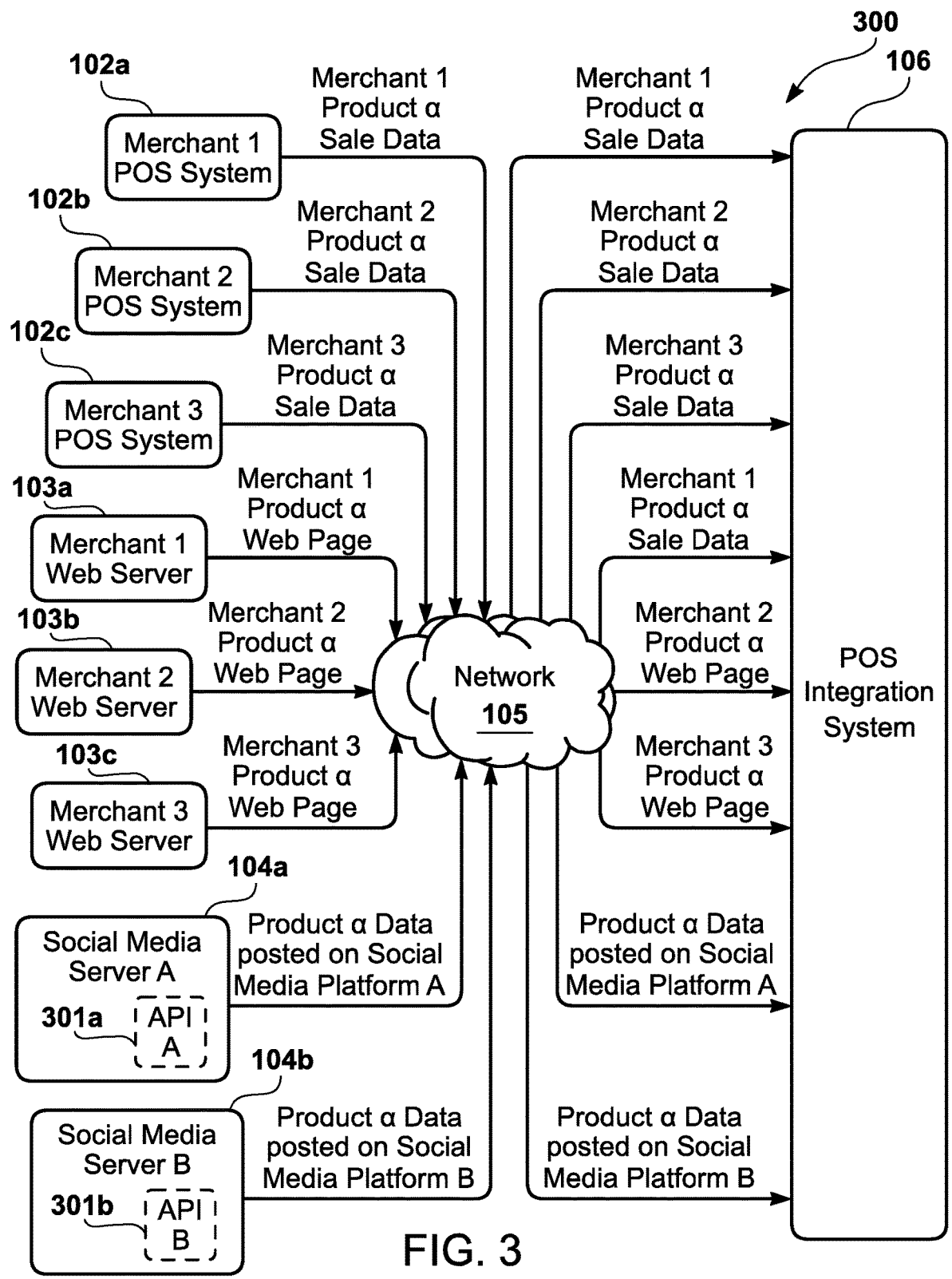
FIG. 3 illustrates an ingestion configuration.

FIG. 3 illustrates an ingestion configuration 300. In order for the POS integration system 106 illustrated in FIG. 1 to integrate various data from different merchants into an integrated data structure for automatic feature adjustments and dynamic searching, the POS integration system 106 receives data from various sources via the network 105. For instance, each of the merchant POS systems 102a-c, which correspond to different merchants, may send sales data for the product α through the network 105 to the POS integration system 106. Furthermore, each of the merchant webservers 103a-c, which correspond to different merchants, may send a webpage, and/or metadata, corresponding to the product α through the network 105 to the POS integration system 106. Finally, each of the social media servers 104a and 104b, which may be operated independently of the merchants, may send data for the product α via a first API 301a and a second API 301b, respectively, through the network 105 to the POS integration system 106. The social media data may be product-specific, merchant-specific, and/or both product-specific and merchant-specific.

Figure 4:
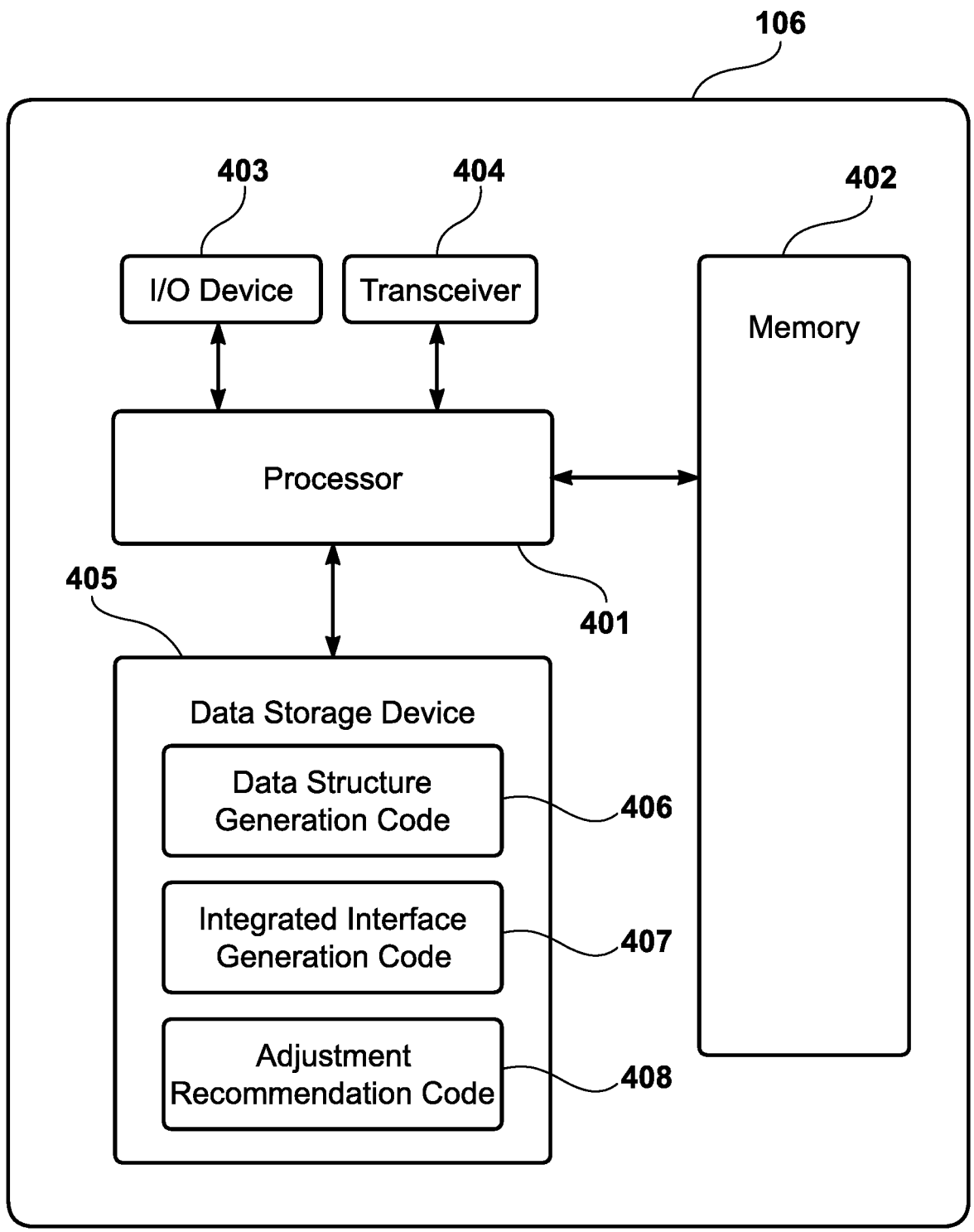
FIG. 4 illustrates a system configuration for the POS integration system illustrated in FIG. 1.

FIG. 4 illustrates a system configuration for the POS integration system 106 illustrated in FIG. 1. The internal components of the POS integration system 106 include a processor 401, which may be specialized for generating a data structure that stores the integrated data, generating a GUI for accessing the integrated data, and generating recommendations for feature adjustments. Further, the internal components of the POS integration system 106 may include a memory device 402, which may be specialized for storing the data structure for the integrated data. For example, the memory device 402 may be optimized to improve access to the integrated data structure.

The memory device 402 may temporarily store computer readable instructions performed by the processor 401. As an example of such computer readable instructions, a data storage device 405 within the POS integration system 106 may store data structure generation code 406 to generate a data structure that links data objects (e.g., POS data and social media data). Furthermore, the data storage device 405 may store integrated interface generation code 407 to generate a GUI for accessing the integrated data within the POS integration system 106. Finally, the data storage device 405 may store adjustment recommendation code 408 that may generate recommendations for adjusting features within the POS integration system 106.

Further, the POS integration system 106 may include a transceiver 404 that transmits and receives data. (Alternatively, a distinct transmitter and receiver may be used instead.) Additionally, the POS integration system 106 may have one or more input/output ("I/O") device 403 (e.g., microphone, keyboard, gestured detection device, etc.) that may be used to provide inputs and/or outputs to the POS integration system 106.

Alternatively, some or all of the illustrated components in FIG. 4 may be implemented by the merchant POS system 102. For example, the components illustrated in FIG. 4 may be used by the merchant POS system 102 when the integration platform 101 is implemented within the merchant POS system 102. As another example, the processor 401 may be implemented by the merchant POS system 102, whereas the data storage device 405 may be implemented remotely in a cloud-based configuration by the integration platform 101, illustrated in FIG. 1A. (These examples are not intended to be limiting, since other implementations may be used instead.)

Figure 5:
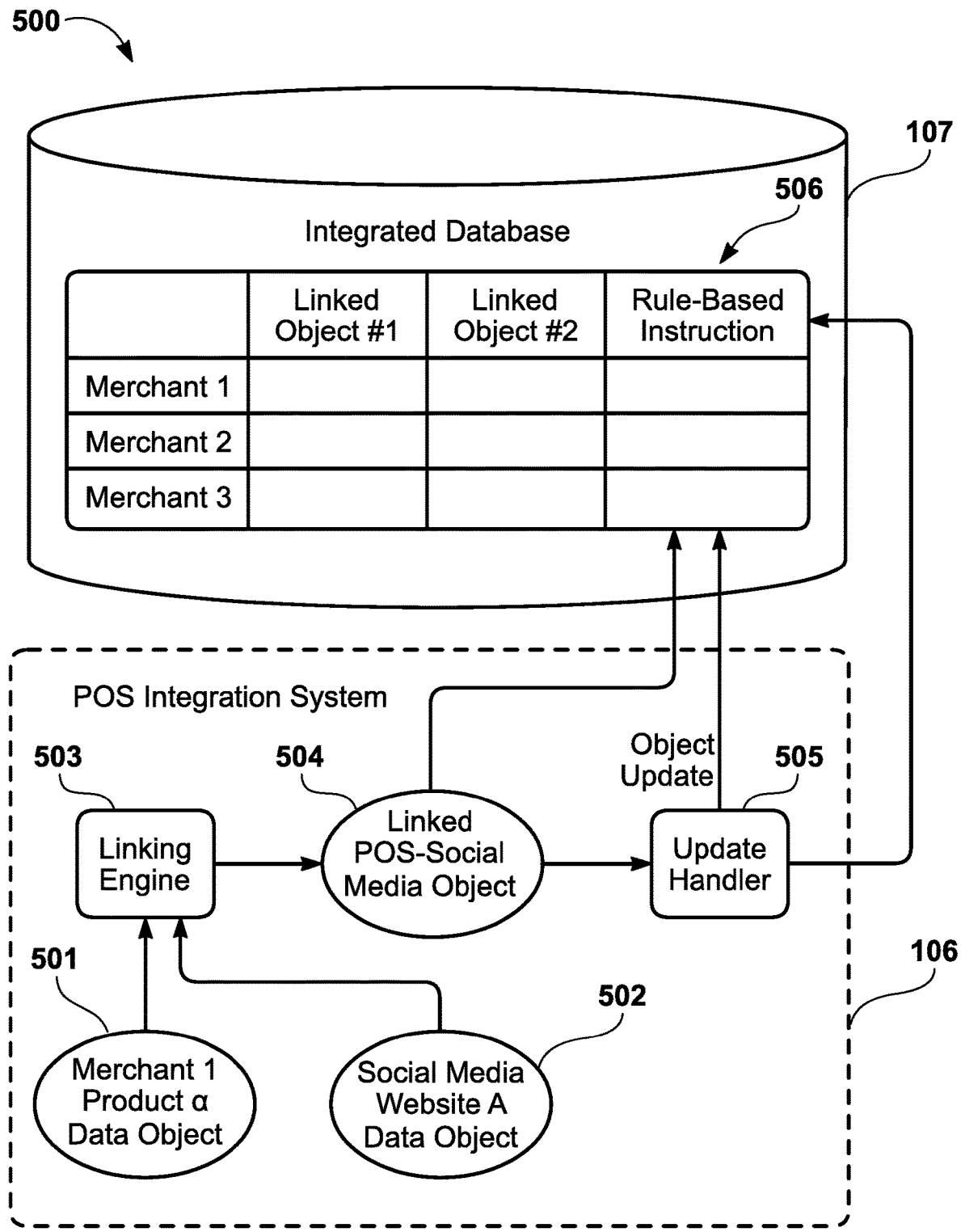
FIG. 5 illustrates a linking configuration, which may be used by the POS integration system illustrated in FIG. 1A or FIG. 1B to integrate data (e.g., POS data, social media data, and/or web portal data) from various sources.

Furthermore, FIG. 5 illustrates a linking configuration 500, which may be used by the POS integration system 106 illustrated in FIG. 1 to integrate data (e.g., POS data, social media data, CRM data, inventory management data, and/or web portal data) from various sources. For example, the POS integration system 106 may receive a first merchant product α data object 501 and a first social media website data object 502. A linking engine 503 may link the first merchant product α data object 501 and the first social media website data object 502, and output a linked POS-social media object 504. By being linked, an adjustment to one data object may affect the other data object, specifically with the execution of rules associated with the different data objects. In particular, the POS integration system 106 may store the linked objects in an integrated POS data structure 506, which is specialized to facilitate computer-implementable execution of rules based on the linkage of the objects, within the integrated database 107. For instance, the integrated POS data structure 506 may be a multi-dimensional array, which has various rows and columns. For example, each row may correspond to a different merchant of product α, whereas each column may correspond to a different field pertaining to data objects associated with product α. The fields may include information (e.g., identifiers, names, etc.) pertaining to the linked objects, as well as one or more rule-based instructions that are automatically implemented upon one or more rules being met. For example, the one or more rule-based instructions may include an automatic price adjustment for the first merchant product α upon one or more social media features (e.g., ratings, number of reviews, etc.) being met.

Although the first merchant product α data object 501 is illustrated as being linked to the first social media website data object 502, other types of data objects may also be linked to the first social media website data object 502. For example, a CRM data object, an inventory management data object, or a web portal data object may be additionally, or alternatively, linked to the first social media website data object 502. As a result, the one or more rule-based instructions may include a combination of conditions based on various data objects in conjunction with one or more conditions based on the first social media website data object 502. As an example, a rule-based instruction may be an automatic price adjustment based on an average social media review being less than a predetermined social media threshold and inventory for the product α exceeding a predetermined inventory threshold. In one embodiment, the price adjustment is propagated through to the merchant POS system 102. As a result, the merchant POS system 102 may update the price of the product α. As an example, the merchant POS system 102 may communicate with one or more electronic price displays situated through a physical brick-and-mortar store to update corresponding price displays based on the price adjustment. As another example, the merchant POS system 102 may communicate with one or more of the terminals 114, illustrated in FIG. 1, to provide the price adjustment in the form of a discount. For instance, the price adjustment may be based on a predefined quantity of the product α previously purchased by the customer at the checkout counter, potentially in addition to other conditions. The discount may then be provided on a customer-specific basis in real-time during the checkout process at the physical brick-and-mortar store. In yet another embodiment, the price adjustment is additionally, or alternatively, propagated through to the merchant website 116, at which the price of the product α is displayed in the GUI 222, as illustrated in FIG. 2C.

Figure 6:
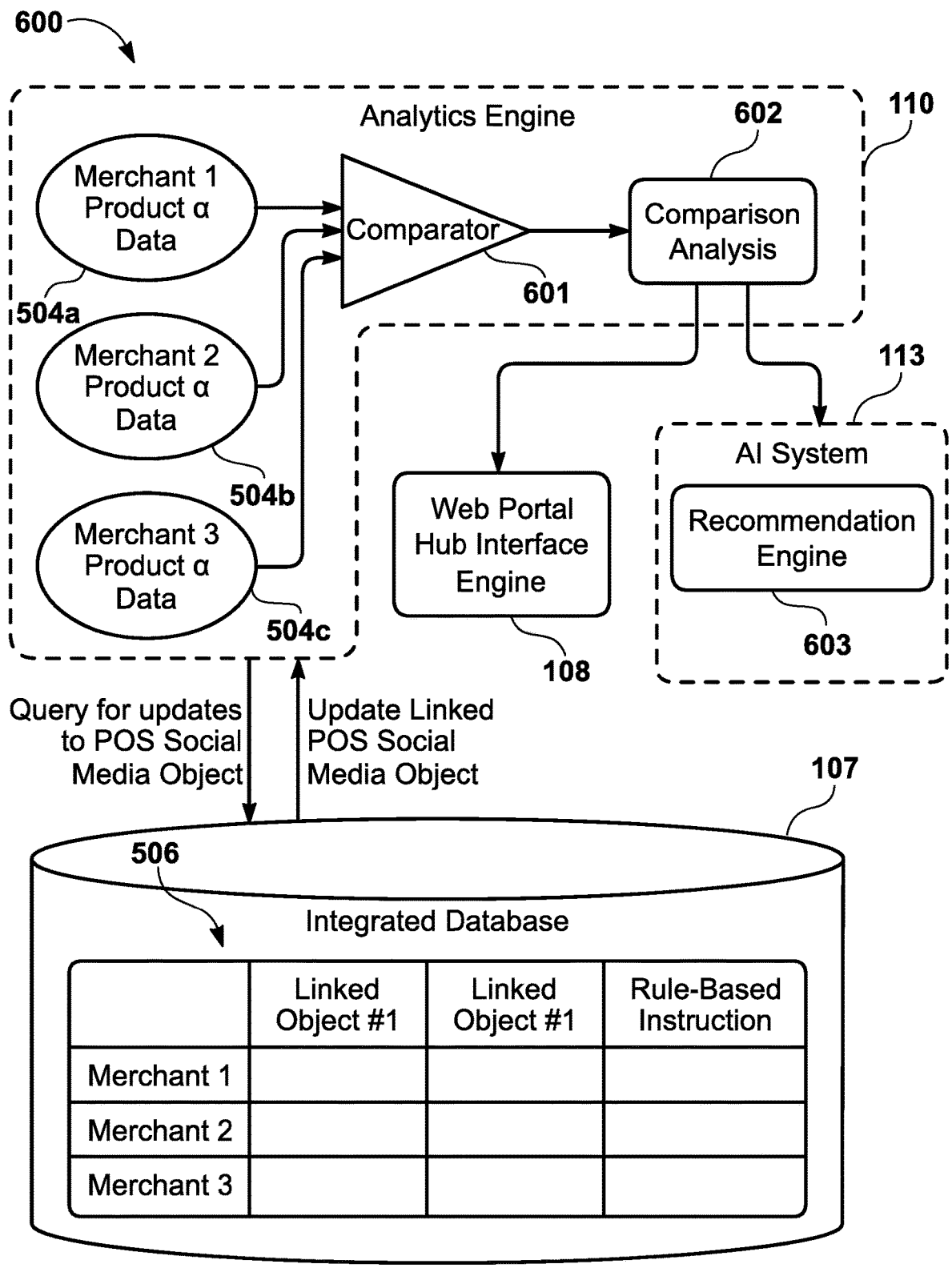
FIG. 6 illustrates an analytics configuration, which may be used by the POS integration system illustrated in FIG. 1A or FIG. 1B to perform analytics on the integrated POS data structure stored in the integrated database, illustrated in FIG. 5.

FIG. 6 illustrates an analytics configuration 600, which may be used by the POS integration system 106 illustrated in FIG. 1 to perform analytics on the integrated POS data structure 506 stored in the integrated database 107, illustrated in FIG. 5. In particular, the analytics engine 110 may submit a query to the integrated database 107 to obtain linked POS-social media objects 504a-c corresponding to the different merchants; these data objects may then be compared by a comparator 601. The analytics engine 110 may then perform a comparison analysis 602 based on the results generated by the comparator 601. Further, the analytics engine 110 may provide the comparison analysis 602 to the AI system 113, which may use a recommendation engine 603 to generate recommendations. In one embodiment, the recommendations may be merchant-specific (i.e., recommendations for a merchant to adjust product features based on offerings by competitors). In another embodiment, the recommendations may be user-specific (i.e., recommendations for a user to purchase from one merchant as opposed to another). Furthermore, the analytics engine 110 may provide the results to the web portal hub interface engine 108 to display the comparisons in a web portal hub.

Figure 7:
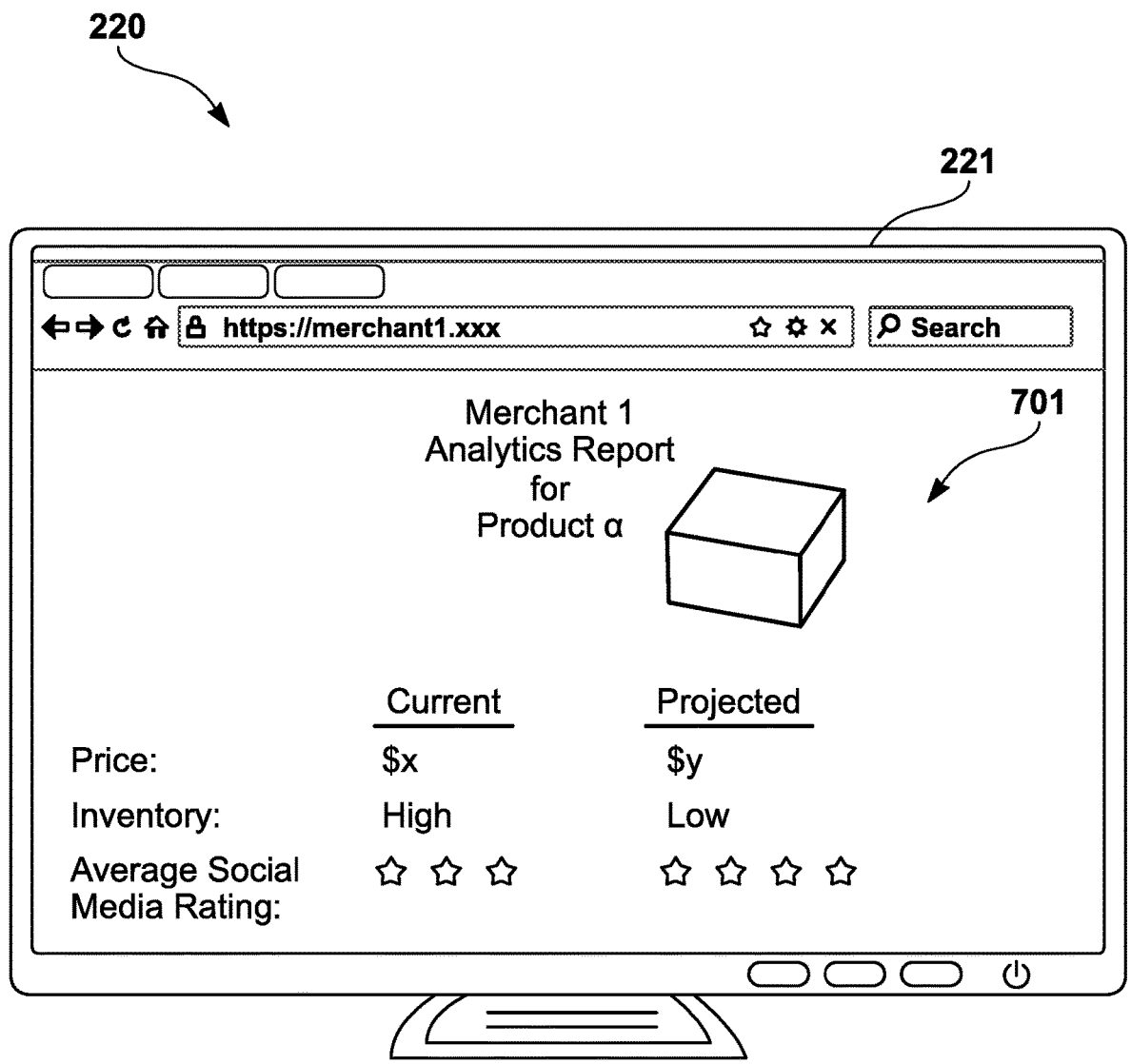
FIG. 7 illustrates an example of a GUI that may be used to display an analytics report generated by the analytics engine in FIG. 6.

As an example, FIG. 7 illustrates an example of a GUI 701 that may be used to display an analytics report generated by the analytics engine 110 in FIG. 6. The analytics report may provide information to the first merchant, for example, with respect to how the first merchant's product offering compares to other competitors. For example, the GUI 701 may display product information such as price, inventory, and average social media rating before an adjustment recommended by the recommendation engine 603 illustrated in FIG. 6. Also, the GUI 701 may display various projections, as determined by the recommendation engine 603, after the adjustment.

Figure 8A:
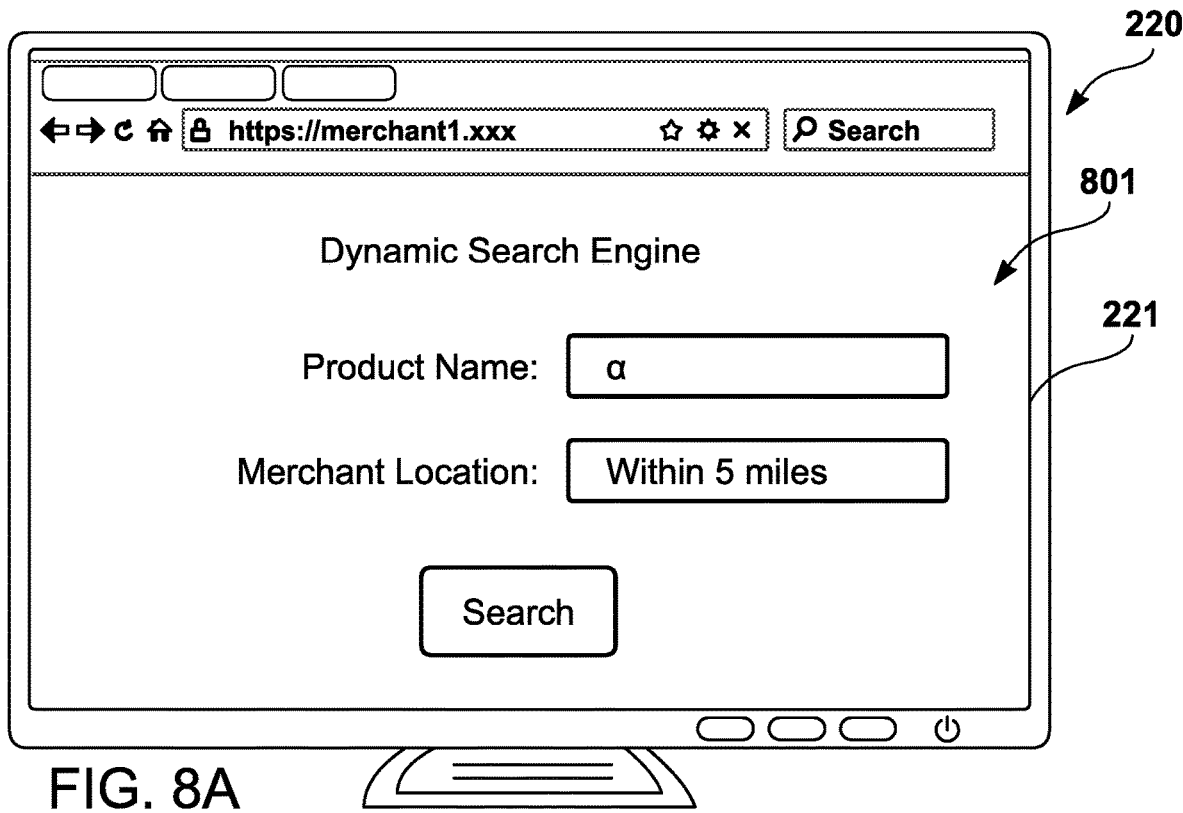
FIG. 8A illustrates an example of a GUI for the dynamic search engine.
Figure 8B:
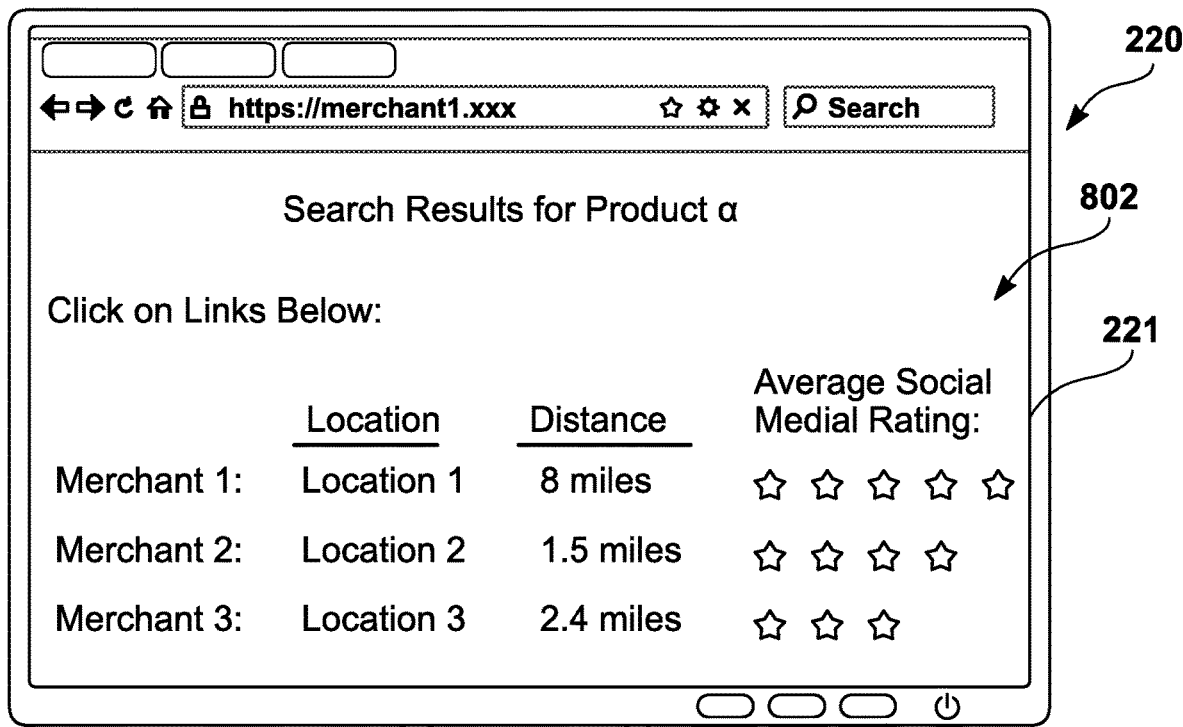
FIG. 8B illustrates an example of a GUI, which depicts search results from a search performed by the dynamic search engine.

Furthermore, FIGS. 8A and 8B display various GUIs that may be used by the dynamic search engine 109 of the POS integration system 106. In particular, FIG. 8A illustrates an example of a GUI 801 for the dynamic search engine 109. The GUI 801 may display various fields (e.g., product name, merchant location, etc.) that allow a user to provide user inputs to perform a search for a particular product. Additionally, FIG. 8B illustrates an example of a GUI 802, which depicts search results from a search performed by the dynamic search engine 109. As an example, the GUI 802 depicts various merchants that sell the product α. Various information such as merchant name, location, distance, product α price, and/or social media rating for the product α and/or merchant may be displayed by the GUI 802. In one embodiment, the search results are limited to the product α, not including other products or variations. As a result, memory requirements for storing search results are reduced, and search optimization is effectuated via searching for a smaller set of data. Furthermore, the user is able to view a concise set of data pertaining to price comparison and social media reviews, all in one GUI, thereby improving the usability of a computing device.

Figure 9A:
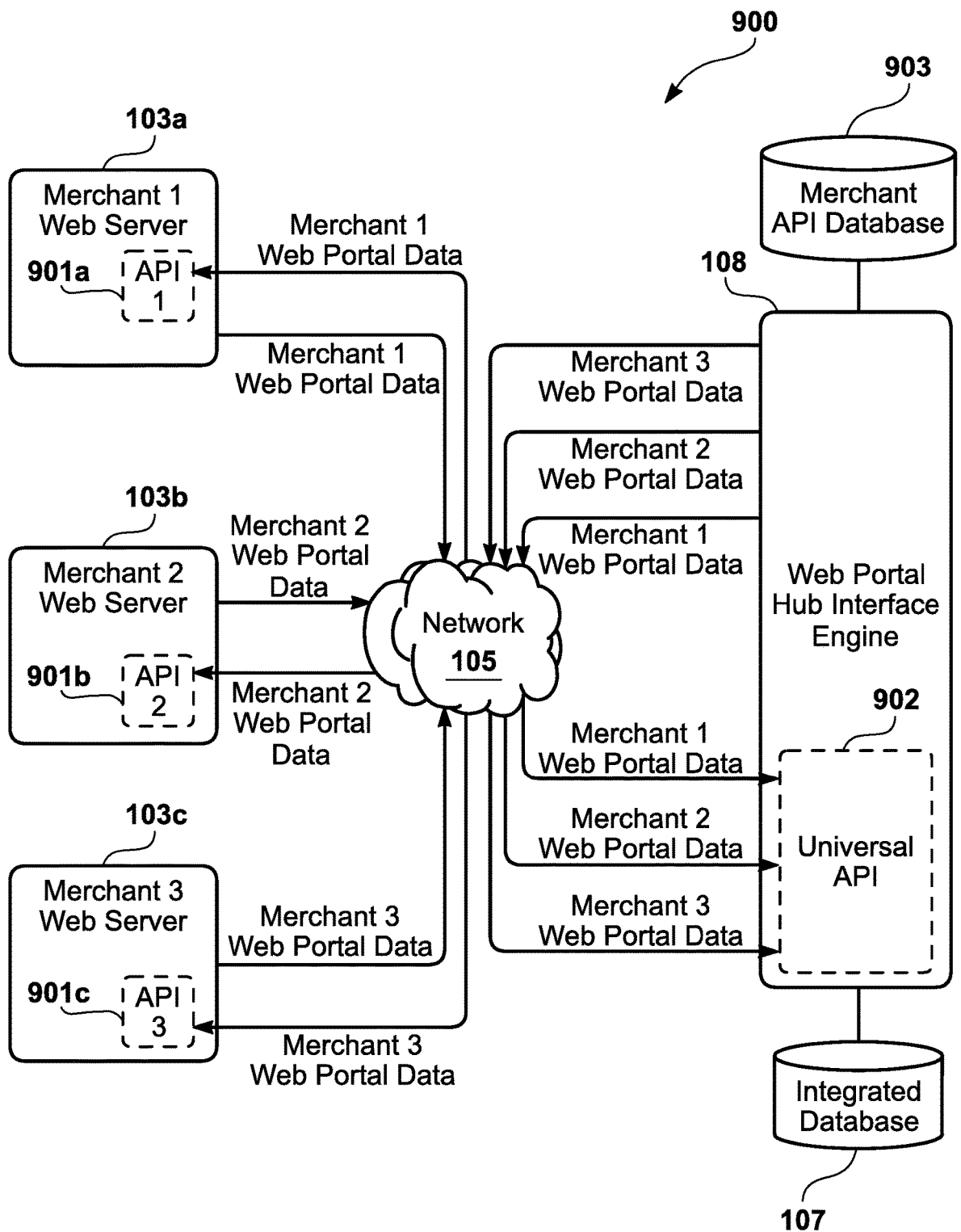
FIG. 9A illustrates a universal web portal configuration in which the web portal hub interface engine has a universal application programming interface ("API") for use with merchant web portal data.
Figure 9B:
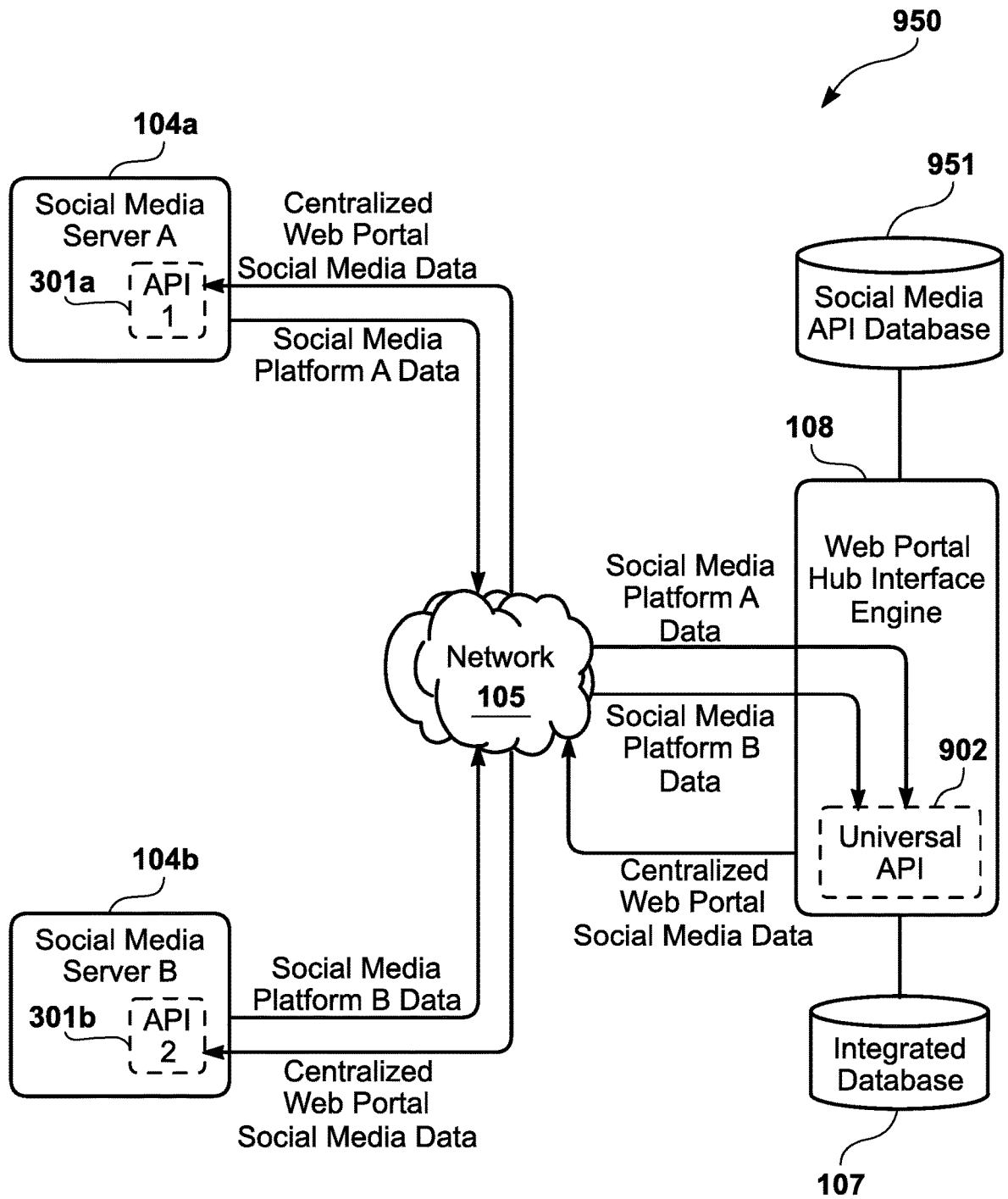
FIG. 9B illustrates a universal web portal configuration in which the web portal hub interface engine has a universal API for use with social media data.

Furthermore, the dynamic search engine 109 is able to access the integrated database 107, illustrated in FIGS. 1A and 1B, in additional ways. For example, FIGS. 9A and 9B illustrate the integrated database 107 storing data in addition, or in the alternative, to the data illustrated in FIGS. 1A and 1B. FIG. 9A illustrates a universal web portal configuration 900 in which the web portal hub interface engine 108 has a universal API 902 for use with merchant web portal data. In particular, the universal API 902 allows merchants with different hardware and/or software configurations (e.g., merchant web servers 901a-c) to communicate in a platform independent manner with the web portal hub interface engine 108. For example, merchants with different system configurations may each make function calls to the same universal API 902 to send data regarding particular products or services from their respective web portals to the web portal hub interface engine 108. Furthermore, the web portal hub interface engine 108 may be in operable communication with a merchant API database 903, which stores the different API specifications for each merchant that is in communication with the web portal hub interface engine 108, thereby allowing the web portal hub interface engine 108 to have seamless unidirectional or bidirectional communication with a merchant regarding web portal data. For example, a first merchant web server 103a may make the same function call, via the universal API 902 of the web portal hub interface engine 108, that a second merchant web server 103b and a third merchant web server 103c would make to post product data or service data on a centralized web portal in operable communication with the web portal hub interface engine 902. Conversely, the web portal hub interface engine 902 uses the merchant API database 903 to determine which of the merchant APIs 901a-c should be used to make a function call to provide product or service data for posting on a particular merchant's web portal.

As another example, FIG. 9B illustrates a universal web portal configuration 950 in which the web portal hub interface engine 108 has a universal API 902 for use with social media data. The universal API 902 also allows social media platforms with different hardware and/or software configurations (e.g., social media servers 104a and 104b) to communicate in a platform independent manner with the web portal hub interface engine 108. For example, social media platforms with different system configurations may each make function calls to the same universal API 902 to send social media posts (e.g., images, videos, blogs, etc.), which may be particular to a user, a product or service, or both, to the web portal hub interface engine 108. Furthermore, the web portal hub interface engine 108 may be in operable communication with a social media API database 951, which stores the different API specifications for each social media platform that is in communication with the web portal hub interface engine 108, thereby allowing the web portal hub interface engine 108 to have seamless unidirectional or bidirectional communication with a social media platform regarding social media data. For example, the social media web server 104a may make the same function call, via the universal API 902 of the web portal hub interface engine 108, that a second social media server 104b would make to request a social media post be displayed on a centralized web portal in operable communication with the web portal hub interface engine 108. Conversely, the web portal hub interface engine 108 uses the social media API database 951 to determine which of the social media APIs 301a and 301b should be used to make a function call to request that a social media post be displayed on a particular social media platform. In other words, a user may access the centralized web portal to directly upload a social media post for viewing on the centralized web portal and for viewing on one or more external social media platforms, without the user having to upload the social media post to each individual social media platform. Accordingly, the user may use the centralized web portal as an interface to link to one or more external social media platforms such that an upload of the social media post to the centralized web portal automatically results in uploads of the social media post to the linked external social media platforms.

Figure 10:
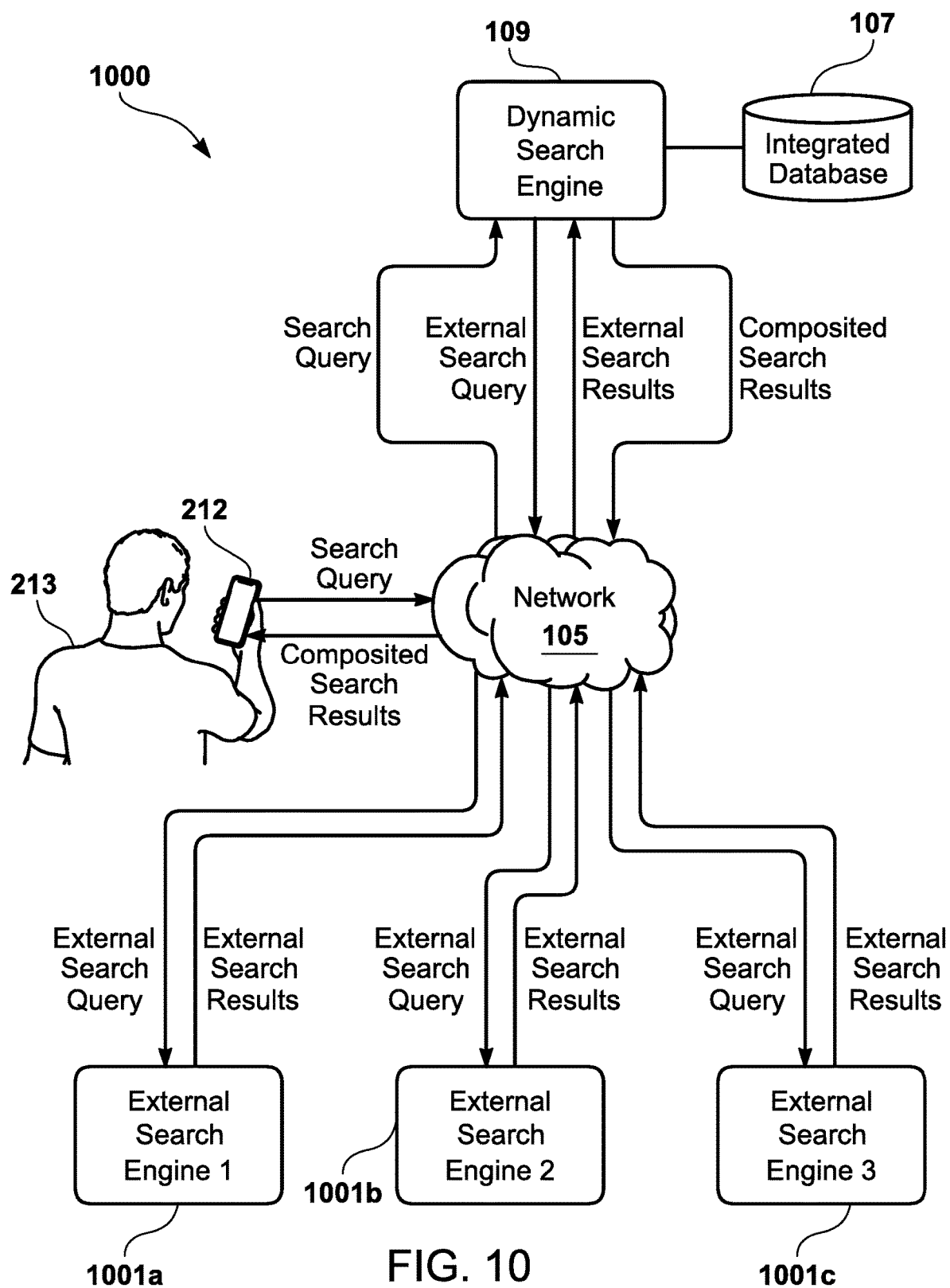
FIG. 10 illustrates a search configuration that generates composited search results based on both internally stored data and data received from one or more external search engines.

Moreover, FIG. 10 illustrates a search configuration 1000 that generates composited search results based on both internally stored data and data received from one or more external search engines 1001a-c. For example, the user 213 may submit a search query for a particular product or service via the computing device 212, through the network 105, to the dynamic search engine 109. In addition to having access to integrated POS data stored by the integrated database 107, as illustrated in FIGS. 1A and 1B, the dynamic search engine 109 may also perform an external search, via the network 105, for the product and/or service through the one or more external search engines 1001a-c. As a result, the dynamic search engine 109 may generate a composite of the internally stored data, via the integrated database 107, and the data obtained via the external search engines 1001a-c. The dynamic search engine 109 may generate the composite by performing a weighting of data depending on the source of the data. For example, the dynamic search engine 109 may assign a higher weight to POS data, received directly from a merchant, than externally received data from the external search engines 1001*a*-*c*, or vice versa. The weighting may affect ranking of the search results.

Figure 11:
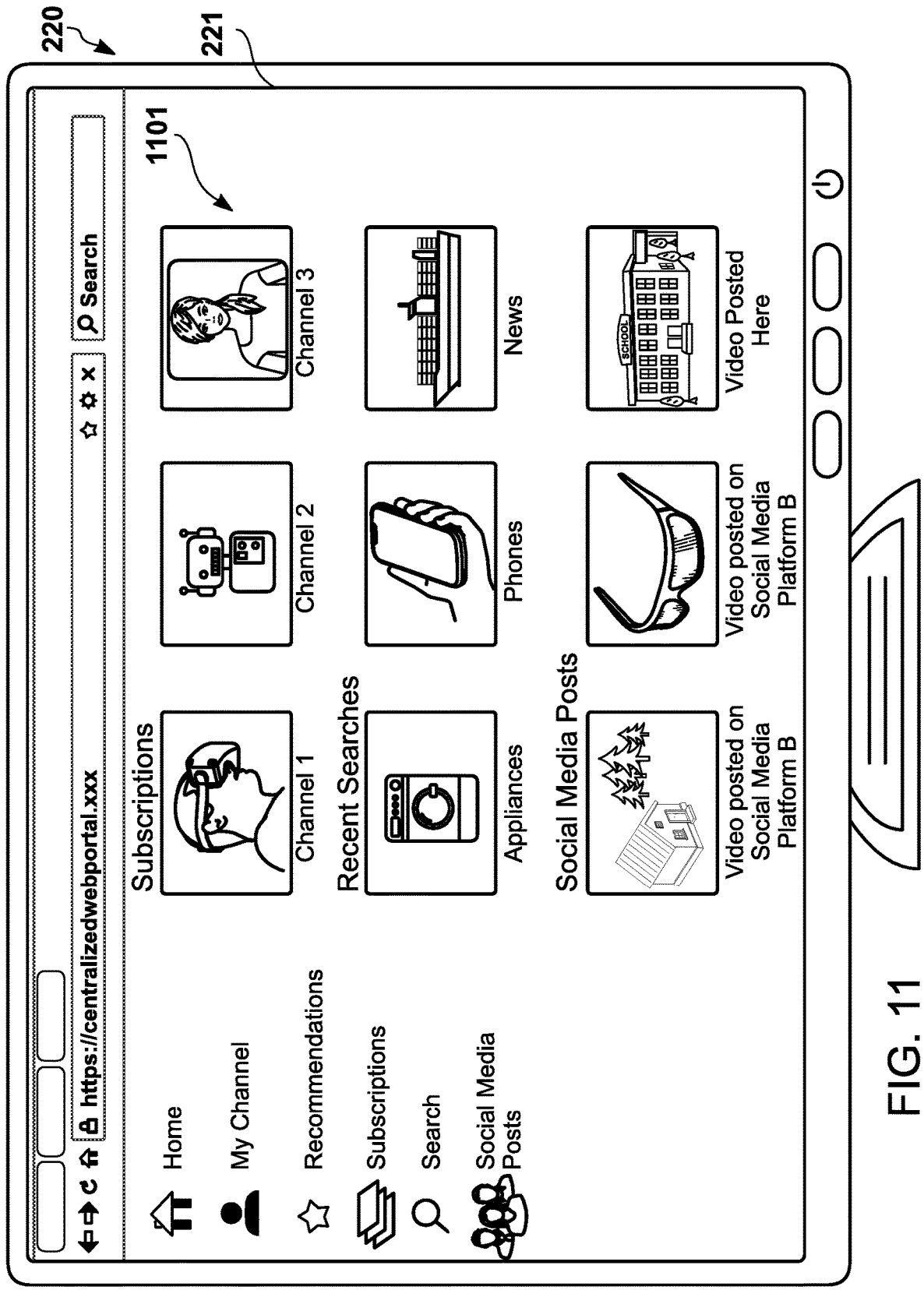
FIG. 11 illustrates an example of centralized web portal that the user may use to access the dynamic search engine illustrated in FIG. 10.

Further, FIG. 11 illustrates an example of centralized web portal 1101 that the user 213 may use to access the dynamic search engine 109 illustrated in FIG. 10. In particular, the web portal hub interface engine 108, illustrated in FIGS. 9A and 9B, may provide data from numerous sources (e.g., merchant web portals, social media platforms, etc.) to be presented in a user-specific manner on the centralized web portal 1101. In particular, the user 213 may customize the centralized web portal 1101 with various channels, subscriptions, and content via one website, rather than having to visit numerous websites to obtain such data. The centralized web portal 1101 allows a user to perform searches, via the dynamic search engine 109, in a robust manner that encapsulates the composited search data from internal and external data sources. Moreover, based on the AI system 113 illustrated in FIG. 6, the centralized web portal 1101 may provide various recommendations additional channels, subscriptions, and other content. The centralized web portal 1101 also allows the user 213 to automatically configure, via linking, social media posts from one user interface, whether for internal or external social media platforms. In essence, the centralized web portal 1101 improves the functioning of a computer by improving the usability of the computing device 221 and reducing search times.

Figure 12:
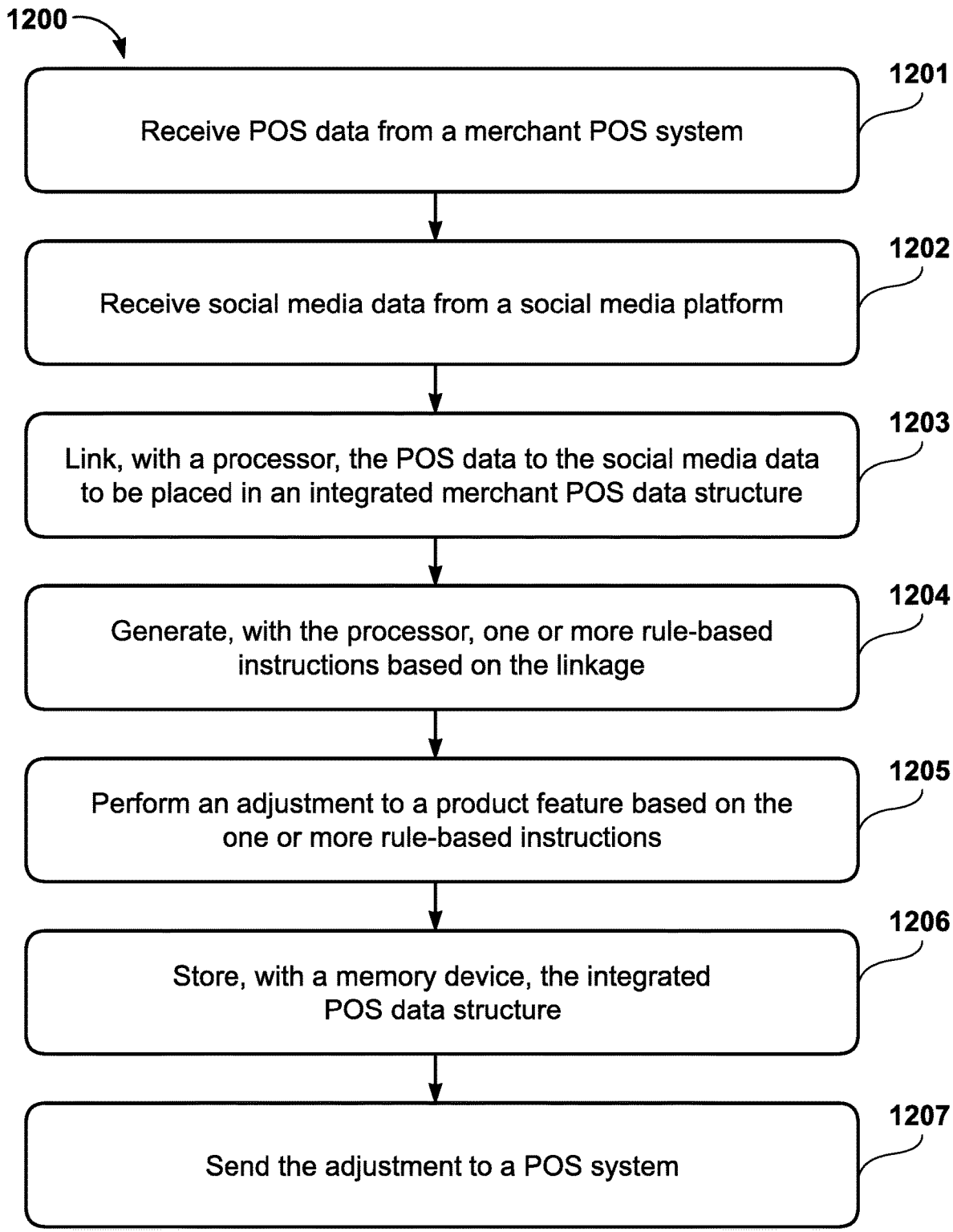
FIG. 12 illustrates a process that may be utilized by the POS integration system.

FIG. 12 illustrates a process 1200 that may be utilized by the POS integration system 106. At a process block 1201, the process 1200 receives POS data from the merchant POS system 102 (i.e., remotely situated. Alternatively, the process 1200 may receive the POS data at the merchant POS system 102 (i.e., local). The POS data is generated as a result of one or more sales at a physical store of a merchant. Alternatively, the one or more sales may occur at a virtual store of the merchant. Furthermore, at a process block 1202, the process 1200 may receive social media data from a social media platform 104*a* or 104*b*. Additionally, at a process block 1203, the process 1200 may link the POS data to the social media data to be placed in an integrated merchant POS data structure 506, as illustrated in FIG. 5. Moreover, at a process block 1204, the process 1200 may generate one or more rule-based instructions based on the linkage. At a process block 1205, the process 1200 performs an adjustment to a product feature (e.g., price, quantity, etc.) based on the one or more rule-based instructions. Additionally, at a process block 1206, the process 1200 stores, with the memory device 402 (FIG. 4), the integrated merchant POS data structure 506. Finally, at a process block 1207, the process 1200 sends the adjustment to the merchant POS system 102.

Although various products are described herein, and illustrated in the accompanying drawings, such products are intended only as examples. Various other products may be used instead. Furthermore, various services may be used instead of products.

A computer is herein intended to include any device that has a specialized processor as described above. For example, a computer may be a personal computer ("PC"), laptop computer, set top box, cell phone, smartphone, tablet device, smart wearable device, portable media player, video player, etc.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A process comprising:
   receiving, at a merchant point of sale system, point of sale data, merchant web portal data, and inventory management data, the point of sale data being generated as a result of one or more sales at a physical store of a merchant;
   extracting, with a processor, product data from the web portal corresponding to a product associated with the point of sale data;
   receiving, via an application programming interface, social media data from a social media platform;
   receiving, from a customer relationship management database, customer relationship management data;
   linking, within an integrated merchant point of sale data structure and with a processor at the merchant point of sale system, a social media object to an object selected from the group consisting of: a point of sale object, a customer relationship data object, and an inventory management data object, the point of sale data object corresponding to the point of sale data, the customer relationship data object corresponding to the customer relationship data object, and the inventory management data object corresponding to the inventory management data;
   automatically generating, with the processor at the merchant point of sale system, one or more linkage-based rules corresponding to the linking, the one or more linkage-based rules comprising one or more social media review conditions, one or more inventory management conditions, or one or more customer relationship management conditions;
   automatically performing, with the processor at the merchant point of sale system, an adjustment to a product price based on the one or more linkage-based rules being met;
   automatically propagating, with the processor at the merchant point of sale system, the price adjustment to one or more display devices at the physical store that access the point of sale data object, the customer relationship data object, or the inventory management data object;
   storing, with a memory device at the merchant point of sale system, the integrated merchant point of sale data structure;
   generating, with the processor, a web portal hub interface that integrates a merchant web portal with a plurality of additional merchant web portals, the merchant web portal corresponding to a merchant associated with the merchant point of sale system, the plurality of additional merchant web portals being associated with a plurality of additional merchants that are distinct from the merchant; and
   generating, with the processor, a dynamic search engine that is limited to searching for an exact product amongst the merchant web portal and the plurality of additional merchant web portals, and displaying only exact product search results.

2. A computer program product comprising a non-transitory computer readable medium having a computer readable program stored thereon, wherein the computer readable program when executed on a computer causes the computer to:

receive, at a merchant point of sale system, point of sale data, the point of sale data being generated as a result of one or more sales at a physical store of a merchant;

receive, via an application programming interface, social media data from a social media platform;

link, within an integrated merchant point of sale data structure and with a processor at the merchant point of sale system, a social media object to a point of sale object, the point of sale data object corresponding to the point of sale data;

automatically generate, with the processor at the merchant point of sale system, one or more linkage-based rules corresponding to the linking, the one or more linkage-based rules comprising one or more social media review conditions;

automatically perform, with the processor at the merchant point of sale system, an adjustment to a product price in the point of sale data object based on the one or more linkage-based rules being met;

automatically propagate, with the processor at the merchant point of sale system, the price adjustment to one or more display devices at the physical store that access the point of sale data object;

store, with a memory device at the merchant point of sale system, the integrated merchant point of sale data structure;

generate, with the processor, a web portal hub interface that integrates a merchant web portal with a plurality of additional merchant web portals, the merchant web portal corresponding to a merchant associated with the merchant point of sale system, the plurality of additional merchant web portals being associated with a plurality of additional merchants that are distinct from the merchant; and generate, with the processor, a dynamic search engine that is limited to searching for an exact product amongst the merchant web portal and the plurality of additional merchant web portals, and displaying only exact product search results.

\* \* \* \* \*